United States Patent
Russell et al.

(10) Patent No.: US 6,574,118 B1
(45) Date of Patent: Jun. 3, 2003

(54) METHOD AND APPARATUS FOR INTERCONNECTING A PRINTED CIRCUIT BOARD ASSEMBLY AND A BASE PLATE OF A DISK DRIVE

(75) Inventors: Michael J. Russell, Longmont, CO (US); Herbert Ross Chessman, Erie, CO (US); Gale D. Johnson, Loveland, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/020,831

(22) Filed: Dec. 12, 2001

Related U.S. Application Data
(60) Provisional application No. 60/288,734, filed on May 4, 2001.

(51) Int. Cl.[7] .............................. H05K 7/14; H05K 7/16; H05K 5/02
(52) U.S. Cl. ................... 361/807; 361/808; 361/809; 361/752
(58) Field of Search ................................ 361/807–810, 361/747, 759, 740, 752, 755, 756, 754, 748, 760; 257/678

(56) References Cited

U.S. PATENT DOCUMENTS

| | | | | |
|---|---|---|---|---|
| 5,420,604 A | * | 5/1995 | Knighton et al. | 360/97.01 |
| 5,502,604 A | * | 3/1996 | Furay | 360/97.01 |
| 6,233,816 B1 | * | 5/2001 | Franke et al. | 29/829 |
| 6,259,032 B1 | * | 7/2001 | Fernandez | 174/138 E |
| 6,427,317 B1 | * | 8/2002 | Choi | 29/603.03 |

* cited by examiner

*Primary Examiner*—David Martin
*Assistant Examiner*—Dameon E. Levi
(74) *Attorney, Agent, or Firm*—Marsh Fischmann & Breyfogle LLP

(57) ABSTRACT

A method for installing a printed circuit board assembly on a disk drive base plate is disclosed, as well as the corresponding structure used for this installation. Generally, the printed circuit board assembly includes a pair of bosses that are each disposed within a corresponding concave slot on the base plate. When installing the printed circuit board assembly, the bosses are disposed within their corresponding slot while the printed circuit is disposed at an angle relative to the base plate. Thereafter, the printed circuit board assembly is pivoted toward and into interfacing relation with the base plate at least generally about the bosses.

64 Claims, 12 Drawing Sheets

Fig. 4C
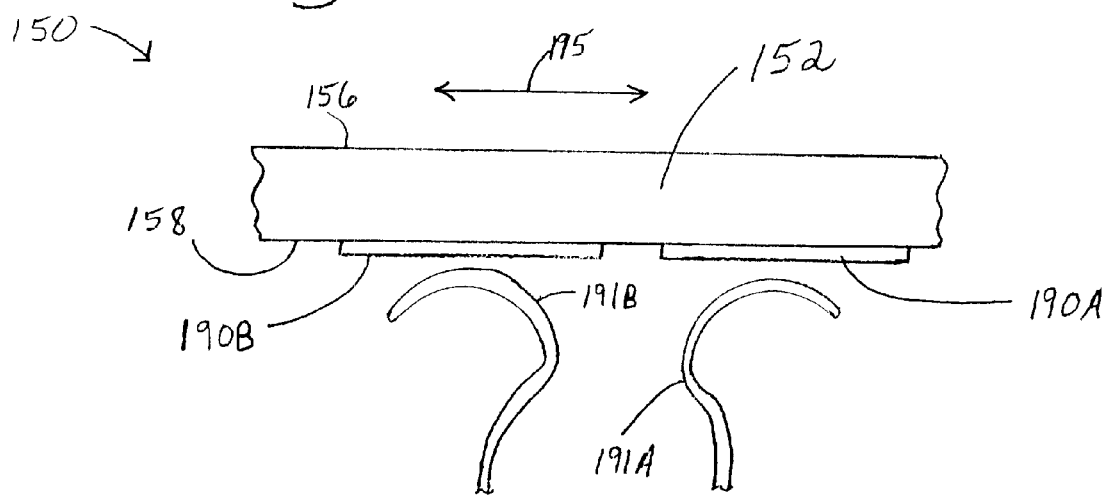
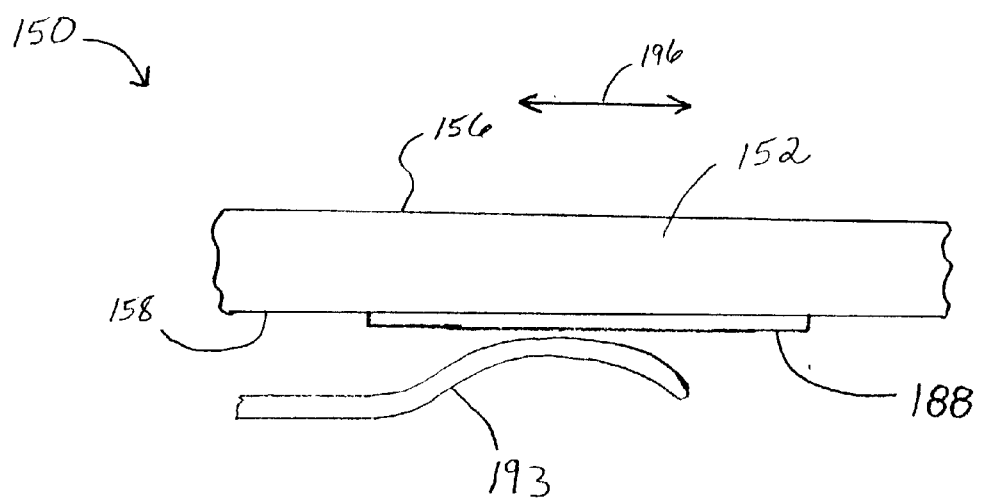
Fig. 4D

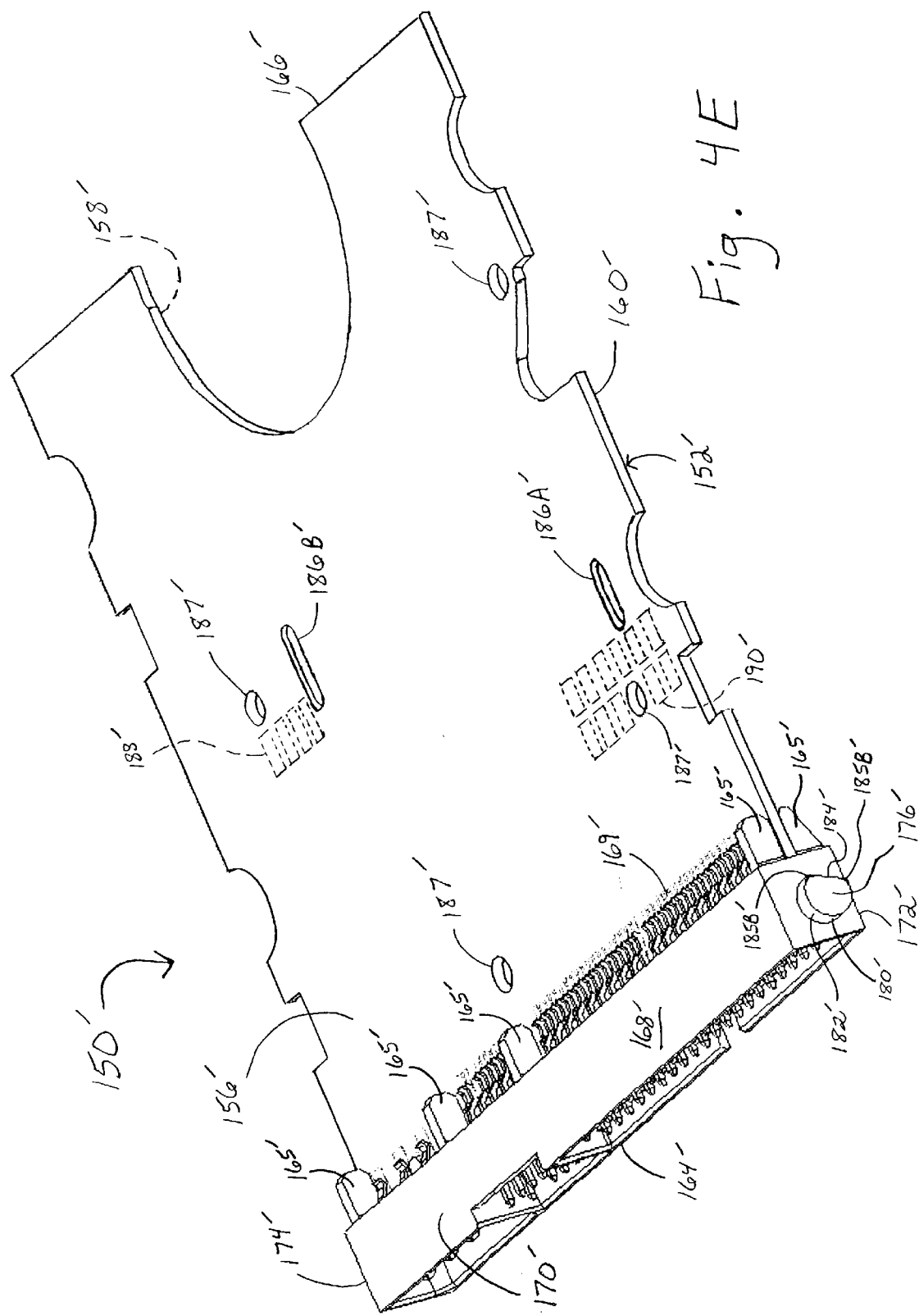

METHOD AND APPARATUS FOR INTERCONNECTING A PRINTED CIRCUIT BOARD ASSEMBLY AND A BASE PLATE OF A DISK DRIVE

CROSS-REFERENCE TO RELATED APPLICATIONS

This patent application claims priority from U.S. Provisional Patent Application Serial No. 60/288,734, filed on May 4, 2001, and entitled "Edge Connector Capture Feature," the entire disclosure of which is hereby incorporated by reference in its entirety herein.

FIELD OF THE INVENTION

The present invention generally relates to disk drives and, more particularly, to a method for installing a printed circuit board assembly on a base plate of the disk drive, as well as the corresponding structure used by this method of installation.

BACKGROUND OF THE INVENTION

Conventional disk drives typically include a base plate and a cover that is detachably connected to the base plate to define a housing for various disk drive components. One or more data storage disks are generally mounted on a spindle which is interconnected with the base plate and/or cover so as to allow the data storage disk(s) to rotate relative to both the base plate and cover via a spindle motor. An actuator arm assembly (e.g., a single actuator arm, a plurality of actuator arms, an E-block with a plurality of actuator arm tips) is interconnected with the base plate and/or cover so as to allow the actuator arm assembly to move relative to both the base plate and cover in a controlled manner. This motion is either typically a pivoting or a linear motion.

A suspension or load beam may be provided for each data storage surface of each data storage disk. Typically each disk has two of such surfaces. All suspensions are appropriately attached to and extend away from the actuator arm assembly in the general direction of the data storage disk(s) during normal operations. A transducer, such as a read/write head, is disposed on the free end of each suspension for purposes of exchanging signals with the corresponding data storage disk. The position of the actuator arm assembly, and thereby each transducer, is controlled by a voice coil motor or the like which moves the actuator arm assembly to dispose the transducer(s) at the desired radial position relative to the corresponding data storage disk.

Another component of the disk drive is a printed circuit board assembly that includes a printed circuit board and an appropriate drive interface connector. The printed circuit board operatively interconnects various components of the disk drive with a central processing unit or the like. After the drive interface connector is attached to the printed circuit board, the printed circuit board assembly is generally affixed to the underside of the base plate of the disk drive using screws. Due to the precision required in handling and/or assembling a printed circuit board assembly, such circuit board assemblies are generally installed onto the base plate by hand (i.e. a person applies screws through the circuit board assembly to affix the circuit board to the base plate). In some instances, one screw is directed through the drive interface connector on both sides thereof to control movement of the drive interface connector away from the base plate. However, this also introduces an undesired strain in the drive interface connector.

Human assembly of disk drive components, including installing printed circuit board assemblies onto base plates of disk drives, offers several potential shortcomings to the assembly process in that circuit boards may not be consistently positioned in the same location from base plate to base plate of respective disk drives. Further, human assembly also allows for variation in the force or torque used to tighten screws against the circuit board assembly and into the base plate, thus inflicting potential strain and/or damage on the printed circuit board assembly. Conversely, the screws may not get fastened sufficiently tight, leaving the potential for variation in distance between a base plate and a respective circuit board assembly and/or undesired vibrations during normal disk drive operations. Relatedly, the more screws that are used to fix the printed circuit board assembly to the base plate, the longer the total assembly time is for the disk drive. The total assembly time obviously has an effect on the total cost of the disk drive. Therefore, it would be desirable to have a printed circuit board assembly and base plate of a configuration that facilitates the installation of the printed circuit board assembly on the base plate.

SUMMARY OF THE INVENTION

The present invention is generally directed to disk drives. More specifically, the present invention is generally directed to a printed circuit board assembly for use with a compatible base plate of a disk drive. This printed circuit board assembly desirably addresses potential malpositioning of the circuit board (with regard to the base plate) associated with installation errors due to human assembly. Accordingly, production and/or assembly of any appropriate type/configuration of a disk drive may benefit from installing a printed circuit board assembly of the invention into a disk drive in a manner described below. Each of the various aspects of the printed circuit board assembly associated with the present invention and to be discussed in more detail below generally include at least one printed circuit board and at least one drive interface connector generally for communication between the disk drive and a central processing unit or the like.

A first aspect of the present invention is embodied in a printed circuit board assembly that is interconnectable with a base plate of a disk drive. The circuit board assembly generally includes a printed circuit board having a first reference axis defining a longitudinal extent of the circuit board, and first and second major surfaces. Since printed circuit boards may be at least generally rectangular or card-shaped, the first and second major surfaces of the printed circuit board define the two surfaces that reflect the greatest surface area of the circuit board. First and second sides of the printed circuit board are at least generally longitudinally extending and laterally spaced relative to the first reference axis. Additionally, the printed circuit board has a first end and a second end that are longitudinally spaced from the first end relative to the first reference axis. Along with a printed circuit board, the printed circuit board assembly has a drive interface connector that is positioned at the first end of the printed circuit board. Additionally, first and second base plate interface bosses extend at least generally away relative to the first and second sides of the printed circuit board, respectively.

Various refinements exist regarding the features noted in relation to the subject first aspect of the present invention. Additional features may also be incorporated in the subject first aspect of the present invention as well. These refinements and additional features may exist individually or in any combination. For instance, the base plate interface bosses are preferably attached to the drive interface connector. In other words, the first and second base plate interface bosses are preferably projections of the drive interface connector which protrude from surfaces of the drive interface connector and which may be substantially aligned with the respective first and second sides of the printed circuit board. Thus, the surfaces of the drive interface connector from which these base plate interface bosses project may be perpendicular to the major surfaces of the printed circuit board. Put another way, the drive interface connector generally includes a housing having first and second ends; accordingly, the first and second base plate interface bosses may be disposed on the respective first and second ends of the drive interface connector. These base plate interface bosses are preferably integrally formed with the housing. Simply as a matter of manufacturing preference, the housing of the drive interface connector and the base plate interface bosses may be formed from plastic or the like. Plastic is used, among other reasons, simply because it is inexpensive, durable, and easily formable to be compatible with the size of a corresponding printed circuit board.

Each of the base plate interface bosses generally includes an annular, peripheral wall having both an arcuate portion and a planar portion. This peripheral wall is preferably perpendicular to the respective surface of the printed circuit board assembly from which the wall projects. However, other arrangements of the peripheral wall that would assist in preventing movement of the printed circuit board assembly from the base plate upon installation are contemplated. For example, a frustoconical configuration of the base plate interface bosses is contemplated, wherein each peripheral wall tapers toward the respective surface of the printed circuit board assembly from which each boss protrudes.

The above-noted planar portion of the peripheral wall is generally disposed at an angle between about 15 degrees and about 45 degrees, and in one embodiment is about 23 degrees, relative to a vertical reference axis. This angle of disposition is generally oriented such that the second major surface of the printed circuit board projects toward the base plate of the recipient disk drive when the printed circuit board assembly is installed on the base plate, and the planar portion of each peripheral wall of the base plate interface bosses at least generally projects toward the second major surface of the printed circuit board. In addition, the planar portion of the peripheral wall preferably at least generally projects toward the second end of the printed circuit board assembly (that which is opposite the drive interface connector). The vertical reference axis, as mentioned above, can be described as an imaginary line that is perpendicular to both the first and second major surfaces of the printed circuit board.

The printed circuit board can include one or more alignment slots. A longitudinal extent of each of the alignment slots is generally substantially parallel to the longitudinal reference axis. These alignment slots each generally define an aperture spanning from the first major surface to the second major surface of the printed circuit board. Thus, a corresponding alignment pin(s) on the base plate can be directed within the respective alignment slot(s) during pivoting assemblage of a base plate assembly in a manner that will be discussed in more detail below.

A second aspect of the present invention includes a base plate assembly for a disk drive that includes a combination of the above-discussed printed circuit board assembly and a complimentarily designed base plate for receiving the printed circuit board assembly. The base plate assembly generally includes a first reference axis defining a longitudinal extent of the base plate assembly. The base plate has a top surface, a bottom surface, and first and second sides that are at least generally longitudinally extending and laterally spaced relative to the first reference axis. First and second ends of the base plate at least generally laterally extend and are longitudinally spaced relative to the first reference axis. The base plate of the base plate assembly also has first and second printed circuit board assembly mounting slots to receive an above-described printed circuit board assembly, which again generally includes a printed circuit board, a drive interface connector, and first and second base plate interface bosses. These mounting slots of the base plate are preferably concave such that the base plate interface bosses on the printed circuit board assembly may be directed therein.

Various refinements exist regarding the features noted in relation to the subject second aspect of the present invention. Other features may also be incorporated in the subject second aspect of the present invention as well. These refinements and additional features may exist individually or in any combination. For instance, the printed circuit board assembly mounting slots are generally disposed at least generally proximate the first end of the base plate. The base plate interface bosses of the printed circuit board assembly are generally positioned in these mounting slots of the base plate. Preferably, the first and second printed circuit board assembly mounting slots are disposed on extensions of the respective first and second sides of the base plate toward the first end of the base plate, wherein these extensions are generally parallel with the first reference axis. A flat may be disposed above each of the printed circuit board assembly mounting slots. A "flat" herein describes a substantially planar stretch of a corresponding wall. Preferably, the flat that corresponds with each of the printed circuit board assembly mounting slots is contained within a reference plane that is at least generally perpendicular to the first and second major board surfaces of the printed circuit board. As such, the planar portion on each of the base plate interface bosses for the above-described printed circuit board assembly may be positioned against a corresponding flat to dispose the printed circuit board in a desired position relative to the base plate before directing the interface bosses into their corresponding mounting slot on the base plate.

At least a portion of each of the printed circuit board assembly mounting slots may be generally arcuately shaped. Preferably the arcuate shape of the mounting slots reflects radii of substantially equal magnitude from a common point of origin within the space defined by the wall of the mounting slot. In other word, the arcuately shaped mounting slots are preferably circle segments. Put another way, each of the printed circuit board assembly mounting slots generally includes an arcuate extent defined by a single radius that extend at least about 190 degrees relative to a central axis about which the mounting slots are positioned. Thus, each of the printed circuit board assembly mounting slots is also preferably at least generally concave such that each of the base plate interface bosses may be directed within the respective mounting slot. Accordingly, an axis of rotation about which the concave printed circuit board assembly mounting slots extend is generally parallel to the first end of the base plate and oriented to span from he first side of the base plate to the second side of the base plate.

In some variations of the second aspect, the wall of each of the printed circuit board assembly mounting slots defines a catch feature to limit vertical movement of the base plate interface boss of the printed circuit board assembly upon engagement of the boss with the mounting slot after the printed circuit board assembly has assumed its final position relative to the base plate. Each of the first and second printed circuit board assembly mounting slots may be generally defined by a slot wall. Accordingly, a portion of the slot wall of the first mounting slot can capture the first base plate interface boss therein, and a portion of the slot wall of the second mounting slot can capture the second base plate interface boss therein. To provide clearance for the initial positioning of the printed circuit board assembly at an angle relative to the base plate and the subsequent pivotal movement of the printed circuit board assembly about the rotational axis formed by the relationship of the mounting slots and the base plate interface bosses, the first end of the base plate can have a chamfer that extends at least from the first mounting slot to the second mounting slot.

The base plate interface bosses generally can prevent dissociative movement of the first end of the printed circuit board assembly from the base plate when installed. In other words, once the first end of the printed circuit board assembly is properly engaged into a cooperatively configured area of the base plate to the disk drive, the relationship between the base plate and the base plate interface bosses of the printed circuit board assembly restricts movement of the first end of the printed circuit board assembly. Put another way, the base plate interface bosses and the printed circuit board assembly mounting slots, in combination, generally form a structure for preventing significant vertical movement of the first end of the printed circuit board assembly from the base plate when installed. The base plate interface bosses generally include a way for pivotally installing the printed circuit board assembly on the base plate. Put another way, the base plate interface bosses of the printed circuit board assembly can generally be engaged with a cooperatively designed portion of the base plate and subsequently rotated or pivoted about an axis that is substantially aligned with an imaginary line extending between the first and second base plate interface bosses of the printed circuit board. The circuit board may also include a plurality of screw holes to affix the printed circuit board assembly to the base plate. However, preferably none of the plurality of screw holes extends through the drive interface connector. In other words, while screws or other appropriate fasteners known in the art may be utilized to assist in attaching the printed circuit board assembly to the base plate, such fasteners only have contact with the printed circuit board, and not the drive interface connector of the printed circuit board assembly.

Some variations of the base plate assembly of the second aspect include the printed circuit board having elongate spindle motor connection pads that are disposed on a major surface of the circuit board and are perpendicularly oriented to the second lateral reference axis. In such variations, the base plate includes corresponding spindle motor connection contacts designed and configured to operationally receive the spindle motor connection pads upon pivoting the printed circuit board into an installed position on the bottom surface of the base plate. In other words, pivoting the first end of the printed circuit board assembly about the rotational axis defined by the mounting slots of the base plate forms a cooperative engagement of the spindle motor connection pads with the spindle motor connection contacts. Similarly, some variations of the printer circuit board preferably have elongate flex cable connector pads which are disposed on a major surface of the circuit board and are perpendicularly oriented to the second lateral reference axis. In such variations, the base plate includes corresponding flex cable connection contacts designed and configured to operationally receive the flex cable connection pads upon pivoting of the printed circuit board into an installed position on the bottom surface of the base plate. Thus, pivoting the first end of the printed circuit board assembly at/near the first end of the base plate enables a cooperative engagement of the flex cable connector pads with the flex cable connector contacts. Put another way, the respective connection pads and corresponding connection contacts are preferably parallel with the first reference axis to allow for a sliding movement of the respective contacts along the respective pads as the printed circuit board assembly is pivoted into an installed position on the base plate. Those various features discussed above in relation to the first aspect of the present invention may be incorporated in variations of this second aspect of the present invention as well (and vice versa), and in the manner noted above.

A third aspect of the invention is embodied in a method of installing a printed circuit board assembly on a base plate. The method includes disposing the first end of the printed circuit board assembly against the base plate at an angle relative to the base plate assembly. The method further includes pivoting the second end of the printed circuit board assembly toward the base plate and at least generally about the first end of the printed circuit board assembly. In other words, an angle is formed by the first end of the printed circuit board assembly preferably contacting the first end of the base plate. This angle continually decreases as the second end of the printed circuit board assembly converges toward the bottom surface of the base plate.

Various refinements exist of the features noted in relation to the subject third aspect of the present invention. Further features may also be incorporated in the subject third aspect of the present invention as well. These refinements and additional features may exist individually or in any combination. For instance, the dispositioning of the printed circuit board assembly at an angle relative to the base plate before pivoting the printed circuit board assembly toward the base plate may include engaging a flat on each of a pair of mounting bosses on the printed circuit board assembly with a corresponding flat on the base plate. In one embodiment, the printed circuit board assembly is disposed at an angle of about 23 degrees relative to a vertical axis (stated another way, at an angle of about 67 degrees between the printed circuit board and the "underlying base plate" prior to pivoting the printed circuit board assembly into the desired final position relative to the base plate). In any case, these corresponding flats on the printed circuit board assembly and the base plate may also be used to direct or guide the above-noted mounting bosses on the printed circuit board assembly within a pair of mounting slots that are formed on the base plate. That is, the printed circuit board assembly may be maintained in a relatively constant angular orientation relative to the general extent of the base plate as the first end of the printed circuit board assembly is moved at least generally toward the base plate to fully seat the mounting bosses within the mounting slots, and including in an at least generally perpendicular manner to the general extent of base plate.

The third aspect may also include simultaneously locking the first end of the printed circuit board assembly to the base plate by the noted above-noted pivoting of the printed circuit board assembly into the installed position against the base plate. This locking of the printed circuit board assembly to the base plate may include restricting vertical movement of the first end of the printed circuit board assembly away from base plate by pivoting the printed circuit board assembly under a "catch" or sorts. Other ways of fixing the printed circuit board assembly to the base plate may be utilized, including directing one or more screws through the printed circuit board and into the base plate. In one embodiment, none of these screws pass through a drive interface connector that may be disposed on the first end of the printed circuit board. Therefore, deflections of the drive interface connector in the "z" dimension are limited without directing any screws therethrough and which may cause undesired strain in the drive interface connector housing.

Certain alignment features may be incorporated into the subject third aspect of the present invention. For instance, one or more alignment pins may be disposed on the surface of the base plate that interfaces with the printed circuit board when fully installed. In this regard, a corresponding number of alignment slots may be included on the printed circuit board. Generally, any such alignment slot would be elongated in a direction that is at least generally parallel with the direction of the pivoting motion of the printed circuit board assembly during installation of the same to the base plate. Corresponding electrical contacts on the printed circuit board assembly and base plate may also be disposed so as to also be at least generally parallel with the direction of the pivoting motion of the printed circuit board assembly.

BRIEF DESCRIPTION OF THE DRAWINGS

FIG. 4C is a side view of one embodiment of a relationship between flex connector pads on the printed circuit board assembly of FIG. 4A and associated flex connector contacts on the base plate of FIG. 2.

FIG. 4D is a side view of one embodiment of a relationship between spindle motor connector pads on the printed circuit board assembly of FIG. 4A and associated spindle motor connector contacts on a base plate of FIG. 2.

FIG. 4E is a perspective view of another embodiment of a printed circuit board assembly, illustrating a plurality of alignment/stabilization slots.

DETAILED DESCRIPTION

The present invention will now be described in relation to the accompanying drawings, which at least assist in illustrating the various pertinent features thereof. By way of initial summary, the present invention relates to disk drives and, more particularly, to a way of attaching a printed circuit board assembly to a base plate of a disk drive, where the configuration of the printed circuit board assembly also promotes the maintenance of positioning of the circuit board assembly with regard to the base plate. Further, this printed circuit board assembly may provide strain relief on the drive interface connector which traditionally has been an area prone to circuit board damage.

Figure 1:
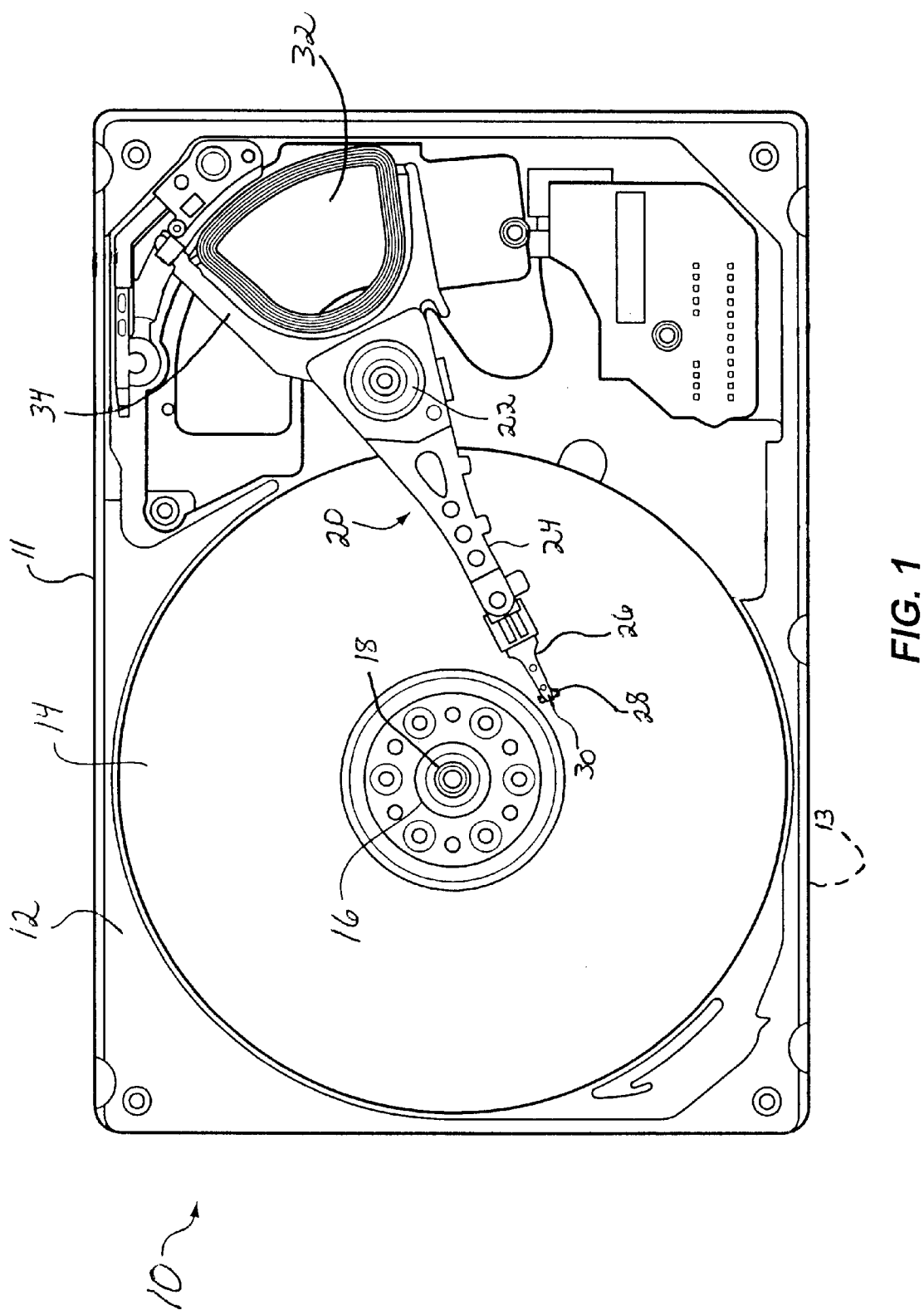
FIG. 1 is a top view of one embodiment of a disk drive.

As a cursory overview of the general components of a disk drive, FIG. 1 illustrates a top view of a disk drive 10 which generally includes a base plate 11 having a top surface 12 and a bottom surface 13. A cover (not shown) is typically disposed atop the base plate 11 and is detachably attached thereto to define an enclosed space for the various disk drive components. The disk drive 10 further includes one or more data storage disks 14 of any appropriate computer-readable data storage media. These data storage disks 14 are generally mounted on a spindle 16, which in turn is rotatably interconnected with the base plate 11 and/or cover of the disk drive 10. Generally, these data storage disks 14 are made from glass, ceramic, or various metals, and each data storage disk 14 preferably possesses first and second opposing disk surfaces, each having a plurality of separate tracks for storing data. A spindle motor 18 is coupled to the spindle 16 to simultaneously spin the data storage disk(s) 14, preferably at a substantially constant rate. For example, current disk drives typically spin at range of about 5,400 RPM to up to about 15,000 RPM, although embodiments outside this exemplary range are contemplated.

The disk drive 10 also includes an actuator arm assembly 20 which pivots about a pivot bearing 22, which in turn is rotatably supported by the base plate 11 and/or cover of the disk drive 10. The actuator arm assembly 20 generally includes one or more individual rigid actuator arms 24 which extend out from near the pivot bearing 22. Each actuator arm 24 generally has a suspension 26 attached thereto. A head 28 is disposed at or near an end of each suspension 26. The head 28 typically includes a body (e.g., slider) and at least one transducer that exchanges signals with the corresponding data storage disk 14.

A voice coil motor (VCM) 32 at least operatively interfaces with the actuator arm assembly 20 at a distal end 34 that is opposite that of the head 28. The VCM 32 imparts motion to the actuator arm assembly 20, and thus to the head 28 (e.g. in response to a control signal). The VCM 32 generally consists of a magnet(s) and a spring-loaded coil of fine wire, although other configurations are contemplated. Notwithstanding the configuration of the disk drive 10 just described, the manner of interconnecting a printed circuit board assembly with a base plate that will now be discussed may be incorporated into any appropriate disk drive configuration.

Figure 2:
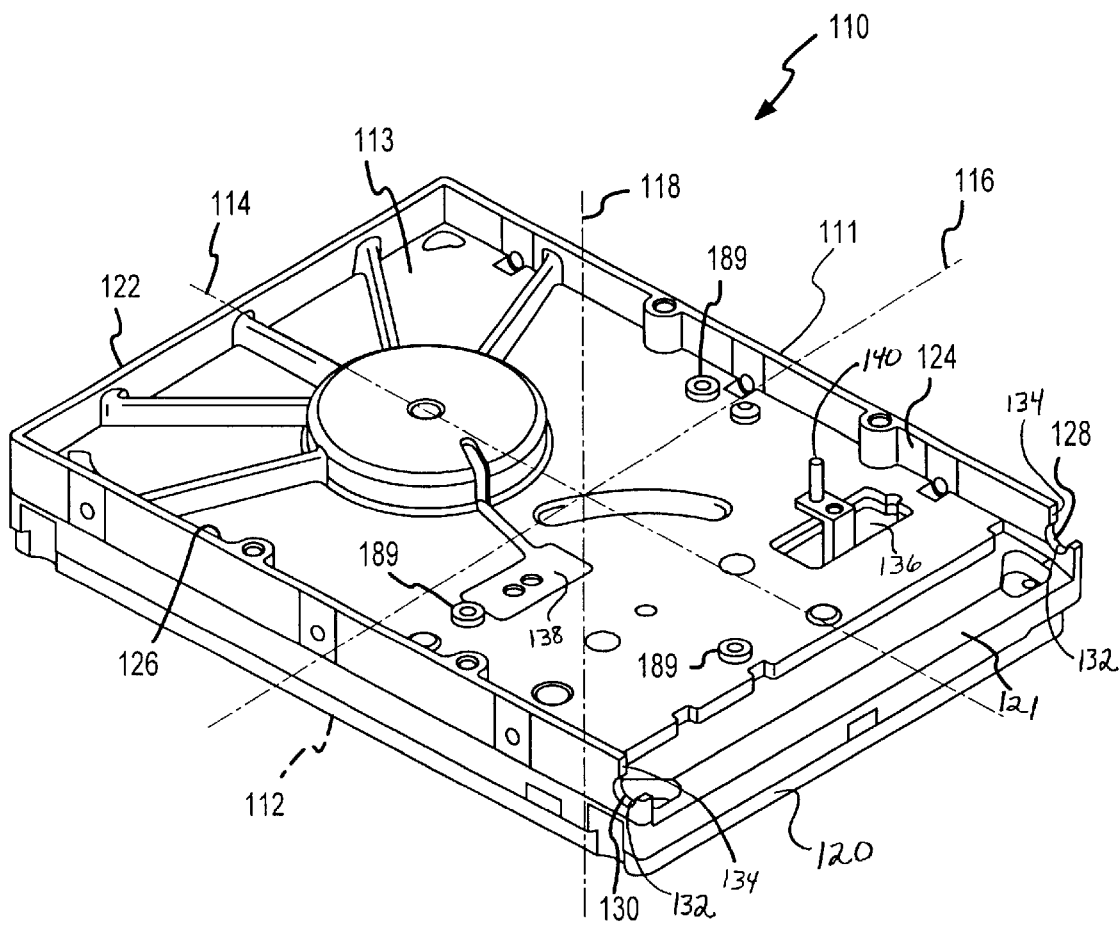
FIG. 2 is a perspective view of one embodiment of a base plate which may be utilized in a disk drive
Figure 3:
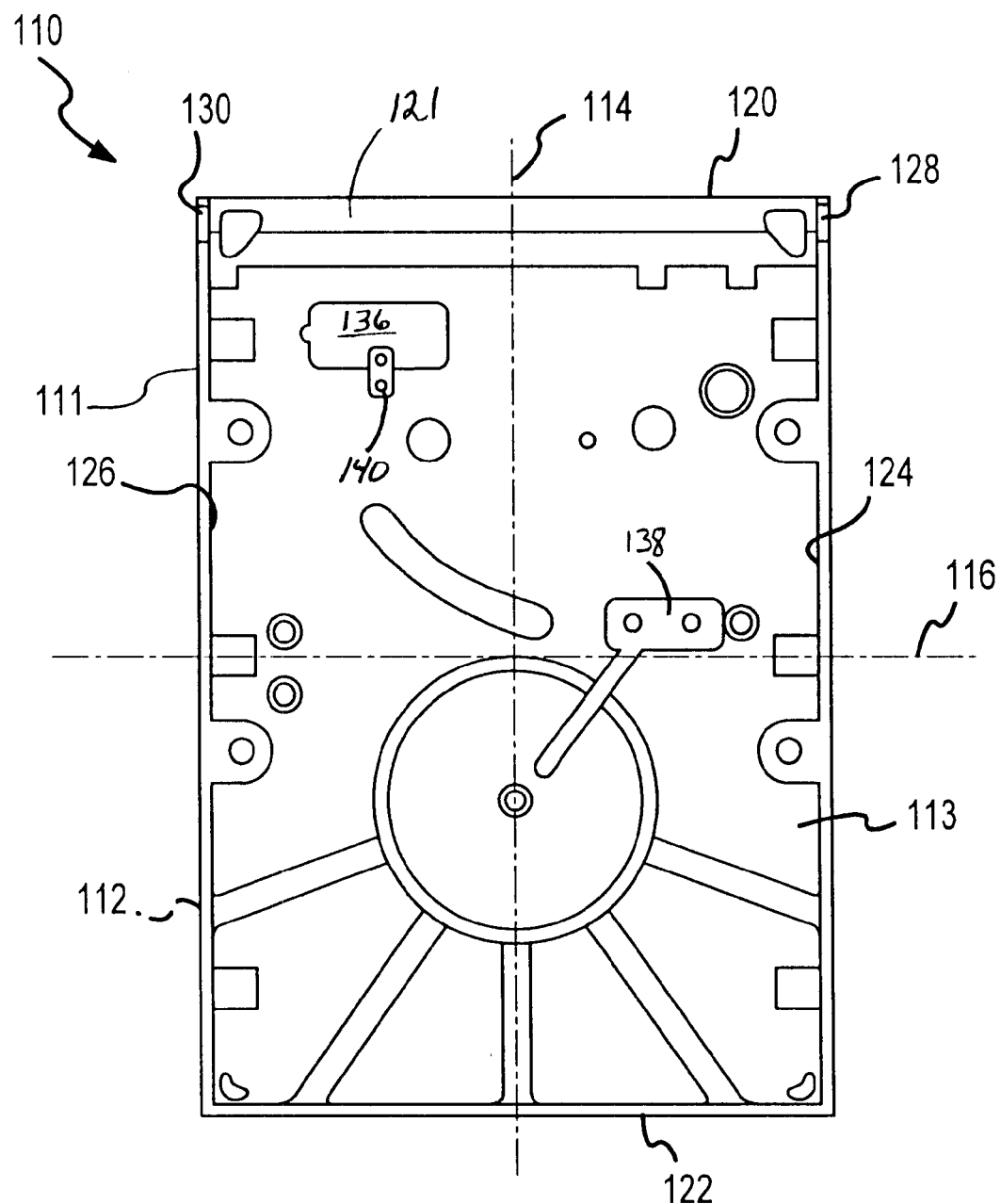
FIG. 3 is a bottom view of the base plate of FIG. 2.

FIGS. 2–3 show one embodiment of a base plate 111 of a disk drive 110 having a central, longitudinally extending first reference axis 114. Hereafter, in relation to the base plate 111, the term "longitudinal", or the like, refers to a direction which is along or parallel to the first longitudinal reference axis 114, while the term "lateral", or the like, refers to a direction which is substantially perpendicular to the reference axis 114 (or along or parallel to a longitudinal midline or second lateral reference axis 116 of the base plate 111). Additionally, in relation to the base plate 111, the term "vertical", "height", or the like, refers to a third vertical reference axis 118 which is substantially perpendicular to both the longitudinal reference axis 114 and the lateral reference axis 116 or, stated another way, to a plane that at least generally contains the base plate 111 (i.e., that which contains the axes 114, 116).

The base plate 111 has a top surface 12 and a bottom surface 113 that define the two major surfaces of the base plate 111. Further, the base plate 111 has first and second ends 120, 122, respectively, which are longitudinally spaced and substantially parallel with the second lateral reference axis 116. The base plate 111 further includes a chamfer 121 (or beveled surface) to facilitate installation of a printed circuit board assembly 150 thereon. Generally, the chamfer 121 slopes toward the top surface 112 progressing toward the first end 120, and in one embodiment is a planar surface that is disposed at an angle relative to a plane that contains the axes 114, 116.

First and second side walls 124, 126 extend out and project away from the bottom surface 113 of the disk drive 110 in a direction that is substantially parallel to the third vertical reference axis 118. These side walls 124, 126 of the base plate 111 generally have a pair of recesses or first and second printed circuit board mounting slots (hereafter "mounting slots") 128, 130 that are disposed at or near the first end 120 of the base plate 111. These mounting slots 128, 130 can be defined in any appropriate manner (e.g., during casting of the base plate 111; by a machining operation after the base plate 111 has been cast).

The mounting slots 128, 130 are at least generally arcuately-shaped, concave, and project or "open up" at least generally away from the bottom surface 113 of the base plate 112. In one embodiment, a wall 132 that defines these slots 128, 130 is defined by a single radius. Other configurations may be appropriate. In any case, the slots 128, 130 are at least generally disposed partially about an axis that is parallel with the axis 116. A flat 134 is disposed above each slot 128, 130, and is preferably oriented in perpendicular relation to a reference plane that contains the axes 114, 116 (e.g., vertically disposed, or parallel to the axis 118).

The base plate 111 has a flex connector area 136 that allows a flex connector cable (not shown) having flex connector contacts (e.g. 191A) to pass through the flex connector area 136 and engage flex connector pads (e.g. 190A) of the printed circuit board assembly 150 (FIG. 4C). Similarly, the base plate 111 also has a spindle motor connector area 138 that allows a spindle motor connector cable (not shown) having spindle motor connector contacts (e.g. 193) to pass through the spindle motor connector area 138 and engage spindle motor connector pads (e.g. 188) of the printed circuit board assembly 150 (FIG. 4D). While the base plate 111 has a variety of apertures and components to promote operational functionality of the disk drive 110, unless otherwise disclosed, these apertures and components are not critical to the installation of a printed circuit board assembly 150 on the base plate 111. Collectively, this base plate 111 and printed circuit board assembly 150 may be characterized as a base plate assembly 119 (FIGS. 5A–7C). Generally, any configuration may be utilized for the base plate assembly 119 that allows a printed circuit board assembly to be installed on a base plate in the manner described herein.

Figure 4A:
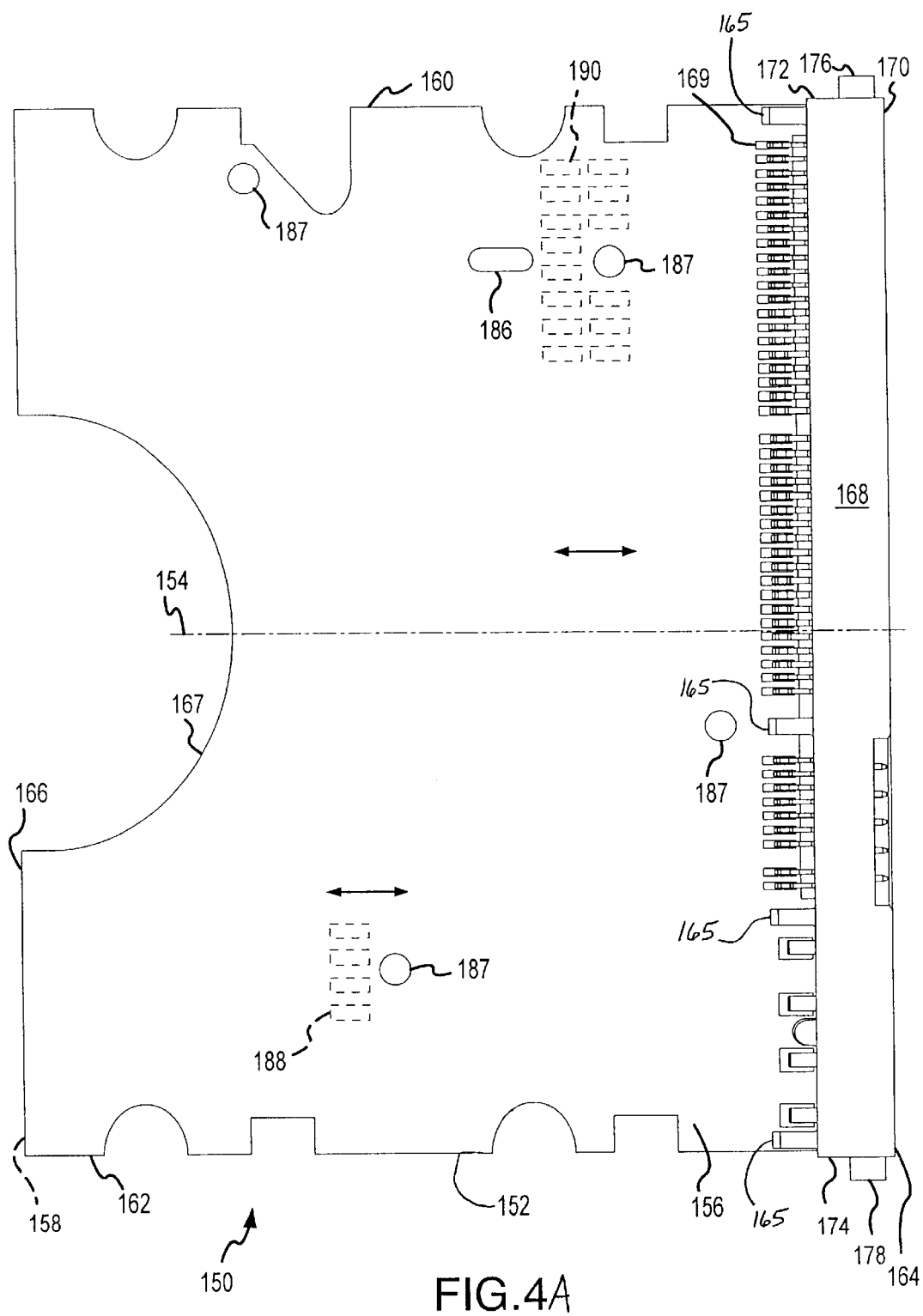
FIG. 4A is a top view of one embodiment of a printed circuit board assembly that may be installed on the base plate of FIG. 2.

FIG. 4A illustrates one embodiment of a printed circuit board assembly 150 which is made up of two main components, namely a printed circuit board 152 and a drive interface connector 168. A longitudinal reference axis 154 defines a longitudinal extent of the printed circuit board assembly 150, and is disposed along/parallel to the axis 114 when installed on the base plate 111. The printed circuit board 152 has first and second major surfaces 156, 158, respectively, and first and second sides 160, 162, respectively, that are at least generally longitudinally extending and laterally spaced relative to the longitudinal reference axis 154. These sides 160, 162 generally have a number of cut-out portions of which enable the printed circuit board 152 to conform to the shape/contour of the corresponding side walls 124, 126 of the base plate 111. Additionally, the printed circuit board has a first end 164 and a second end 166 that are longitudinally spaced relative to the longitudinal reference axis 154. As with the sides 160, 162, the second end 166 of the circuit board assembly 150 generally has a cut-out portion 167 which enables the second end 166 of the printed circuit board 152 to conform to the shape/contour of disk drive components attached to the base plate 111 (e.g. the spindle 16 and spindle motor 18 of FIG. 1).

Disposed at the first end 164 of the printed circuit board 152 is the drive interface connector 168. The drive interface connector 168 can be of any appropriate type (e.g., combination, SCA). Moreover, the drive interface connector 168 can be electrically connected with the printed circuit board 152 in any appropriate manner. For instance, the drive interface connector 168 can be a saddle mount-type connector, wherein the drive interface connector 168 has electrical connections 169 to both the first and second major surfaces 156, 158 of the printed circuit board 152. Alternatively, the drive interface connector 168 can be a surface mount-type connector, wherein the drive interface connector 168 has all electrical connections 169 on only one side of the printed circuit board 152. Regardless of the type of the drive interface connector 168, the electrical connections 169 of the drive interface connector 168 are generally connected to the printed circuit board 152 by soldering or any other appropriate technique. Moreover, one or more "grippers" 165 on the drive interface connector 168 may engage the printed circuit board 152. Any way of electrically and/or structurally interconnecting the printed circuit board 152 and drive interface connector 168 may be utilized.

The printed circuit board assembly 150, preferably on the drive interface connector 168, includes first and second base plate interface bosses 176, 178, respectively. These base plate interface bosses 176, 178 are designed to cooperatively engage with the mounting slots 128, 130 of the base plate 111 upon installation of the printed circuit board assembly 150 onto the base plate 111 of the disk drive 110. Generally, each of the bosses 176, 178 may be directed onto the corresponding slot 128, 130 with the printed circuit board 152 being disposed so as to form an acute angle between the board 152 and the bottom surface 113 of the base plate 111. Then, the printed circuit board 152 is pivoted at least generally about the bosses 176, 178 and to the bottom surface 113 of the base plate 111. Thereafter, the printed circuit board 152 may be appropriately fixed to the base plate 111.

The base plate interface bosses 176, 178 extend at least generally away from the reference axis 154, preferably at least substantially perpendicularly thereto. As such, the axis about which the printed circuit board assembly 150 pivots during installing is also at least substantially perpendicular to the reference axis 154. Preferably, the bosses 176, 178 are attached to and extend away from the drive interface connector 168. In one embodiment the bosses 176, 178 are integrally formed with a housing 170 of the connector 168, such as by injection molding. However, any way of integrating the bosses 176, 178 with the printed circuit board assembly 150 may be utilized.

Figure 4B:
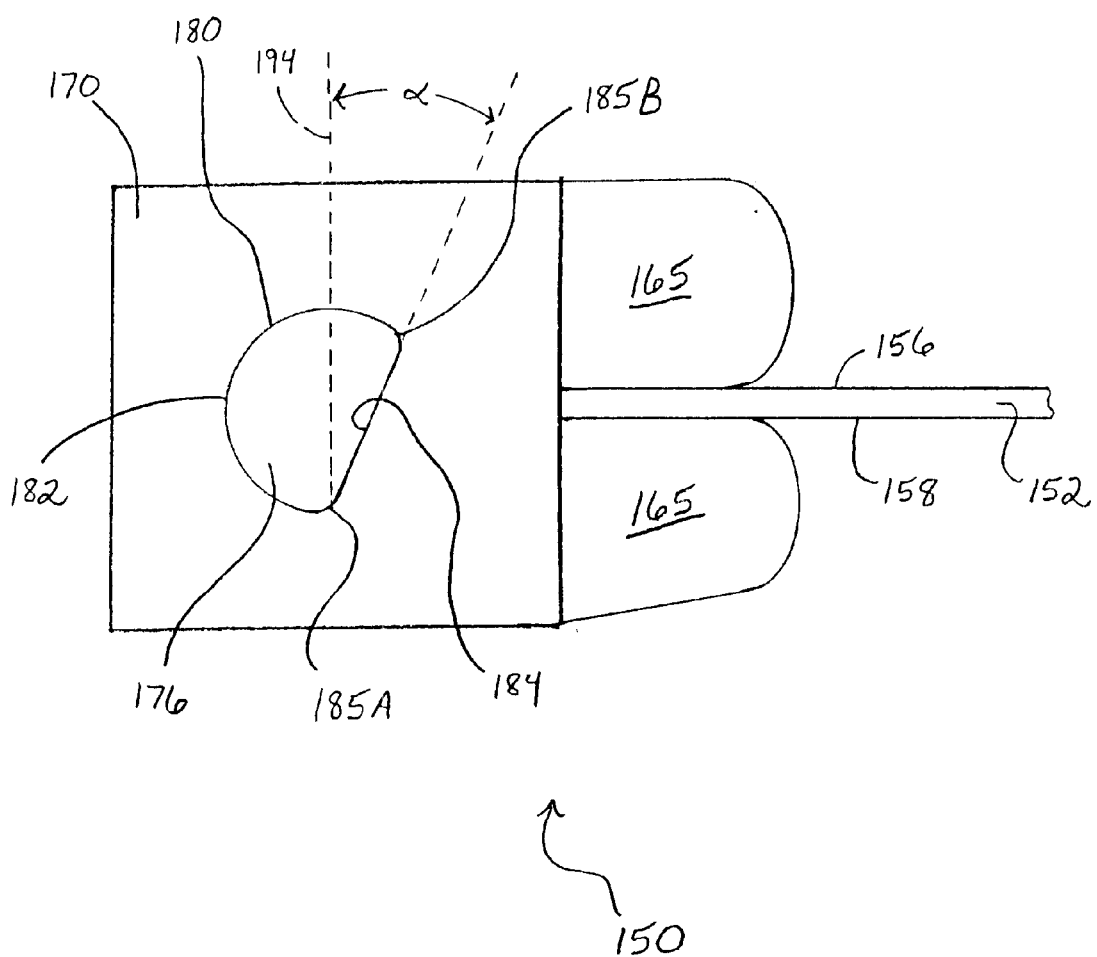
FIG. 4B is a side view of one of the base plate interface bosses of the printed circuit board assembly of FIG. 4A.

The base plate interface bosses 176, 178 are configured to facilitate the installation of the printed circuit board assembly 150 on the base plate 111. As illustrated in FIG. 4B, each boss 176, 178 includes a peripheral wall 180. Each peripheral wall 180 in turn includes an arcuate portion 182 and a planar portion 184. In one embodiment, the arcuate portion 182 is defined by a single radius that is the same as or slightly less than the radius that defines the slots 128, 130. The planar portion 184 projects at least generally toward the second end 166 of the printed circuit board 152, and also at least generally toward the direction which the surface 158 of the printed circuit board 152 projects (e.g., at least generally toward the bottom surface 113 of the base plate 111 when the printed circuit board assembly 150 is installed). Another way of characterizing the angular disposition of the planar portion 184 on each of the base plate interface bosses 176, 178 is that each such planar portion 184 includes a first vertical extreme 185A and a second vertical extreme 185B, with the second vertical extreme 185B being disposed further from the surface 113 of the base plate 111 when installed, and also closer to the second end 1616 of the printed circuit board 152. In one embodiment, the planar portion 184 is disposed at an angle α that is within a range of about 15 degrees to about 45 degrees relative to a reference axis 194 that is perpendicular to the surfaces 156, 158, and more preferably is about 23 degrees.

Referring back to FIG. 4A, the printed circuit board 152 has a first alignment slot 186 which is elongated or elliptically shaped. The first alignment slot 186 is made up of an aperture that extends through the printed circuit board 152 from the first major surface 156 to the second major surface 158. The longitudinal extent of this first alignment slot 186 is substantially parallel with the longitudinal reference axis 154 of the board 152 to enable a stabilization pin 140 on the base plate 111 (FIGS. 2 and 3) to protrude through the alignment slot 186 and prevent lateral movement of the circuit board assembly 150 relative to the base plate 111 after installation of the circuit board assembly 150 on the base plate 111 (as in FIG. 7C). Such lateral movement, for example, includes, but is not limited to, clocking, wherein the alignment slot 186 works in combination with the corresponding stabilization pin 140 of the base plate 111 to restrict rotational movement of the printed circuit board assembly 150 relative to the base plate 111. In other words, "clocking" refers to limiting the rotational movement of the printed circuit board 152 about an axis (e.g., 118) on the base plate 111.

The second major surface 158 of the printed circuit board of FIG. 4A has a set of longitudinally oriented spindle motor connector pads 188 and a set of longitudinally oriented flex connector pads 190. Both the pads 188, 190 are illustrated as being elongate or rectangular, or as having a major axis of elongation that is at least generally parallel with the reference axis 154. This orientation of the pads 188, 190 enables the respective corresponding connector contacts from the base plate 111 to slide along these pads 188, 190 during the installment of the circuit board assembly 150 onto the base plate 111 by the above-noted pivoting motion, while still providing operational communication with the corresponding connector contacts after the installation is completed. Stated another way, the orientation of the pads 188, 190 increases the potential for establishing contact with the corresponding connector contacts on the base plate 111, even though the above-noted pivotal motion is utilized to install the board 152. While the longitudinal orientation of the connector pads 188, 190 disposed on the second major surface 158 of the circuit board 152 provides a desired advantage, the location, number, and size of such connector pads 188, 190 is not meant to be a critical or limiting feature.

FIG. 4C shows a relationship between a pair of flex connector pads 190A, 190B of the printed circuit board 152 and their corresponding flex connector contacts 191A, 191B from the base plate 111. Similarly, FIG. 4D shows a relationship between one of the spindle motor connector pads 188 and a corresponding spindle motor connector contact 193 from the base plate 111. As the printed circuit board assembly 150 is pivoted toward the base plate 111, the respective connector pads 188, 190A, and 190B will approach and eventually contact the respective connector contacts 193, 191A, and 190B. In both FIGS. 4C and 4D, the connector pads 188, 190A, and 190B reflect the elongate orientation also illustrated in FIGS. 4A and 4B for pads 188 and 190 to show that a change in position along the longitudinal direction arrows 195, 196 (parallel with the axes 114 and 159) will not disrupt contact between the connector pads 188, 190A, and 190B and their associated connector contacts 193, 191A, and 191B due to the elongate configuration of the pads 188, 190A, and 190B. This then provides a degree of tolerance for using a pivotal motion to install the printed circuit board assembly 150 on the base plate 111.

The printed circuit board assembly 150 of FIG. 4A also includes a plurality of fastener apertures 187 which define holes that span entirely from the first major surface 156 to the second major surface 158 of the printed circuit board 152. Upon proper installation of the printed circuit board assembly 150 onto the base plate 111, the fastener apertures 187 preferably line up with fastener receptacles 189 of the base plate 111 such that a fastener (e.g. screw or a bolt) can extend entirely through the fastener aperture 187 of the circuit board 152 and cooperatively engage walls of the associated fastener receptacle 189 of the base plate 111 (e.g. via complimentary threadings) to hold the printed circuit board assembly 150 in a fixed securement to the base plate 111 of the disk drive 110. While the fastener apertures 187 are located in the circuit board 152, no fastener apertures 187 are found in the drive interface connector 168. Accordingly, the use of base plate interface bosses 176, 178 provides strain relief to the electrical connection(s) 169 between the printed circuit board 152 and the drive interface connector 168 of the circuit board assembly 150 by enabling affixation of the drive interface connector 168 to the base plate 111 utilizing the two bosses 176, 178 disposed at the opposing ends 172, 174 of the drive interface connector 168 in a manner to be discussed in more detail below.

A variation of the printed circuit board assembly 150 is illustrated in FIG. 4E. Corresponding components are identified by the same reference numerals, although a "single prime" designation is used in FIG. 4E. The printed circuit board assembly 150' of FIG. 4E principally differs from the FIG. 4A embodiment by including more than one alignment slot 186A', 186B' to correspond with an equal number of stabilization pins on the corresponding base plate (not shown).

Figure 5A:
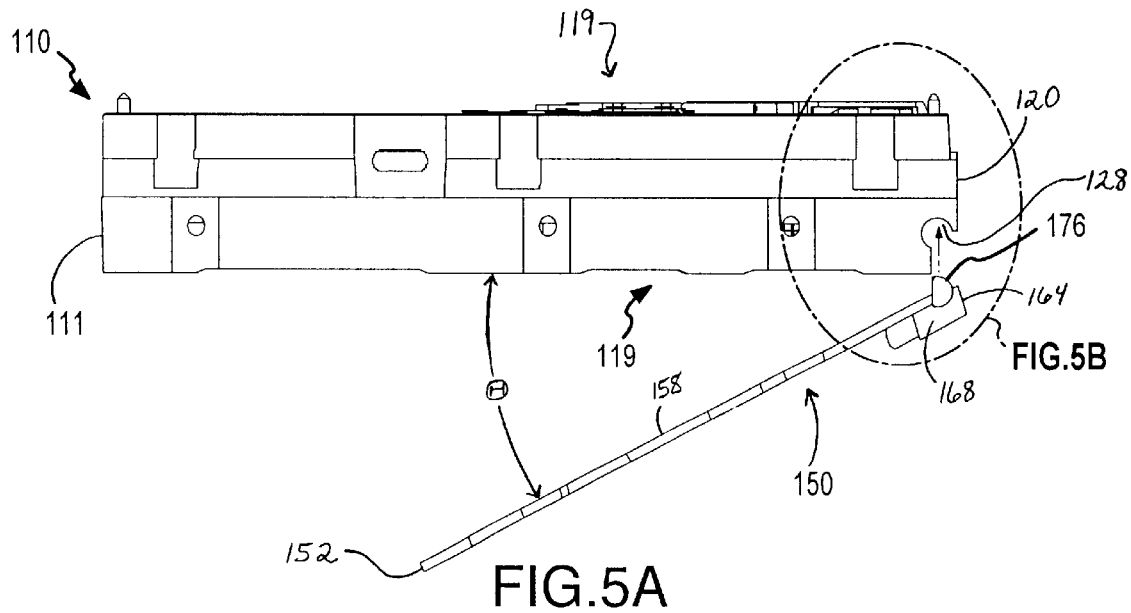
FIG. 5A is a side view of the base plate of FIG. 2, with the printed circuit board assembly of FIG. 4A being positioned for insertion in the mounting slot of the base plate.
Figure 5B:
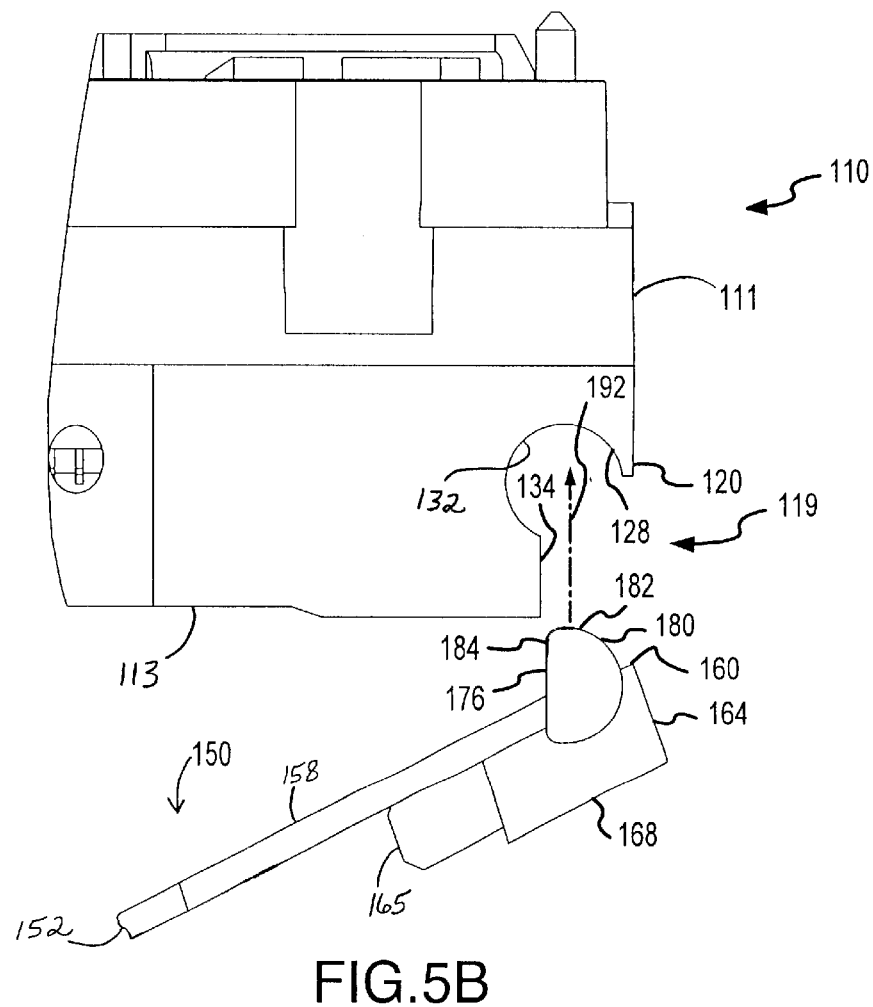
FIG 5B is a magnified side view of circle 5B of FIG. 5A.

FIGS. 5A–7C illustrate one embodiment of a method for installing the printed circuit board assembly 150 on the base plate 111. FIGS. 5A and 5B illustrate a first step in a method for installing the printed circuit board assembly 150 onto the base plate 111 of the disk drive 110. The first end 164 of the printed circuit board assembly 150 is positioned at least generally at the first end 120 of the base plate 111 at an angle Θ that corresponds with the angle α noted above, and with the second major surface 158 of the printed circuit board 152 at least generally facing the bottom surface 113 of the base plate 111. More specifically, the planar portion 184 of the peripheral wall 180 of the base plate interface boss 176 is positioned parallel to the flat 134 associated with the slot 128 by a movement of the printed circuit board assembly 150 in the direction of motion indicated by arrow 192. The base plate interface boss 178 is similarly positioned relative to its corresponding mounting slot 130. In other words, the flats 134 "above" the mounting slots 128, 130 are vertically oriented and substantially aligned with the planar portions 184 on the base plate interface bosses 176, 178. This disposes the printed circuit board assembly 150 into the proper position for entry of the base plate interface bosses 176, 178 into the corresponding slots 128, 130 (e.g., at the angle Θ).

Figure 6A:
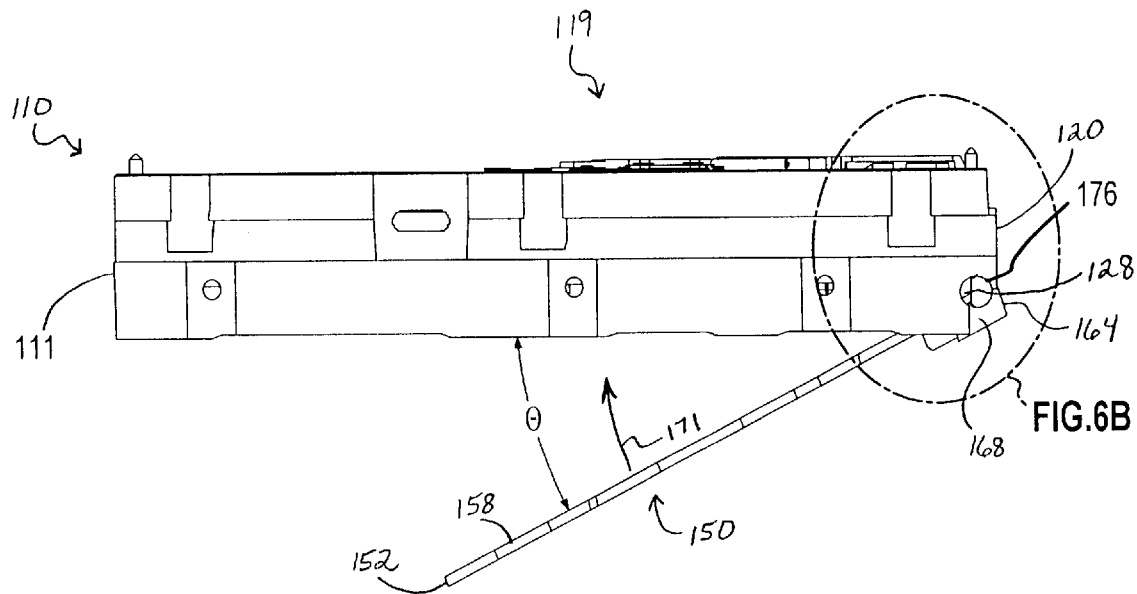
FIG. 6A is a side view of the base plate of FIG. 2, with the base plate interface bosses of the printed circuit board assembly of FIG. 4A being fully seated in the mounting slots of the base plate.
Figure 6B:
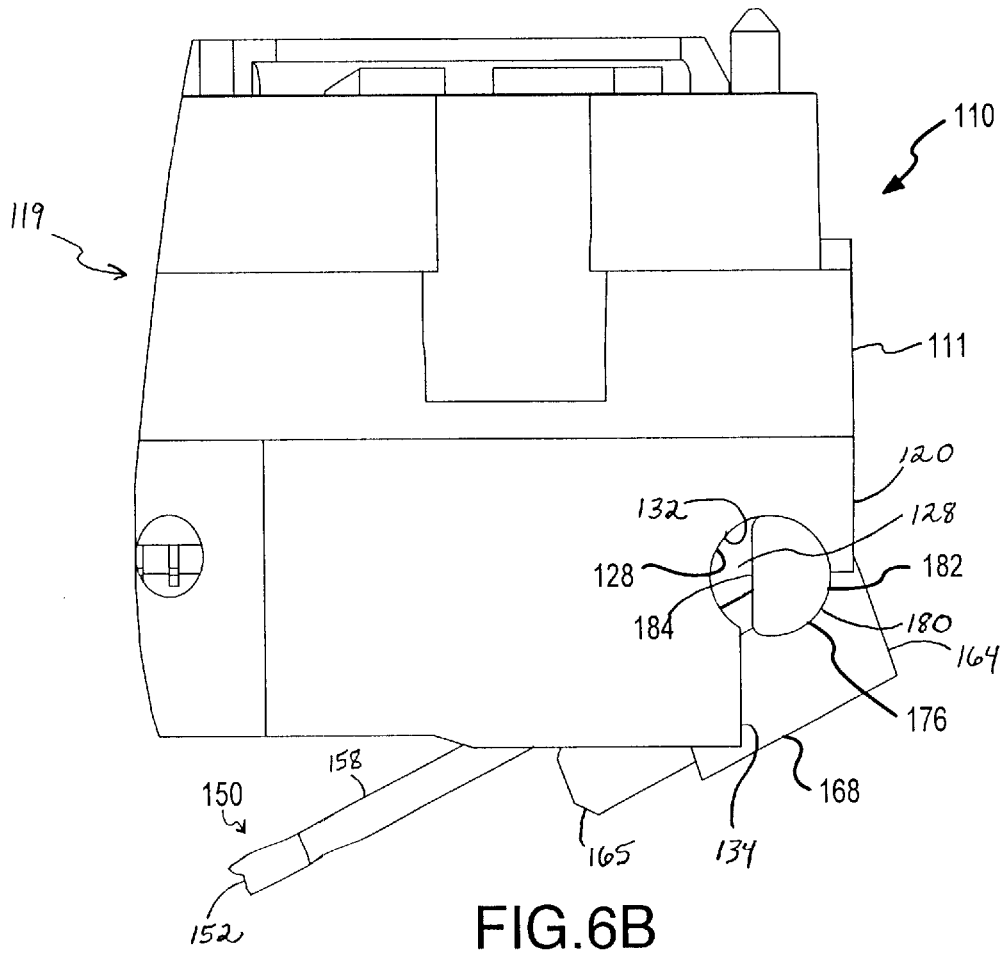
FIG. 6B is a magnified side view of circle 6B of FIG. 6A.
Figure 6C:
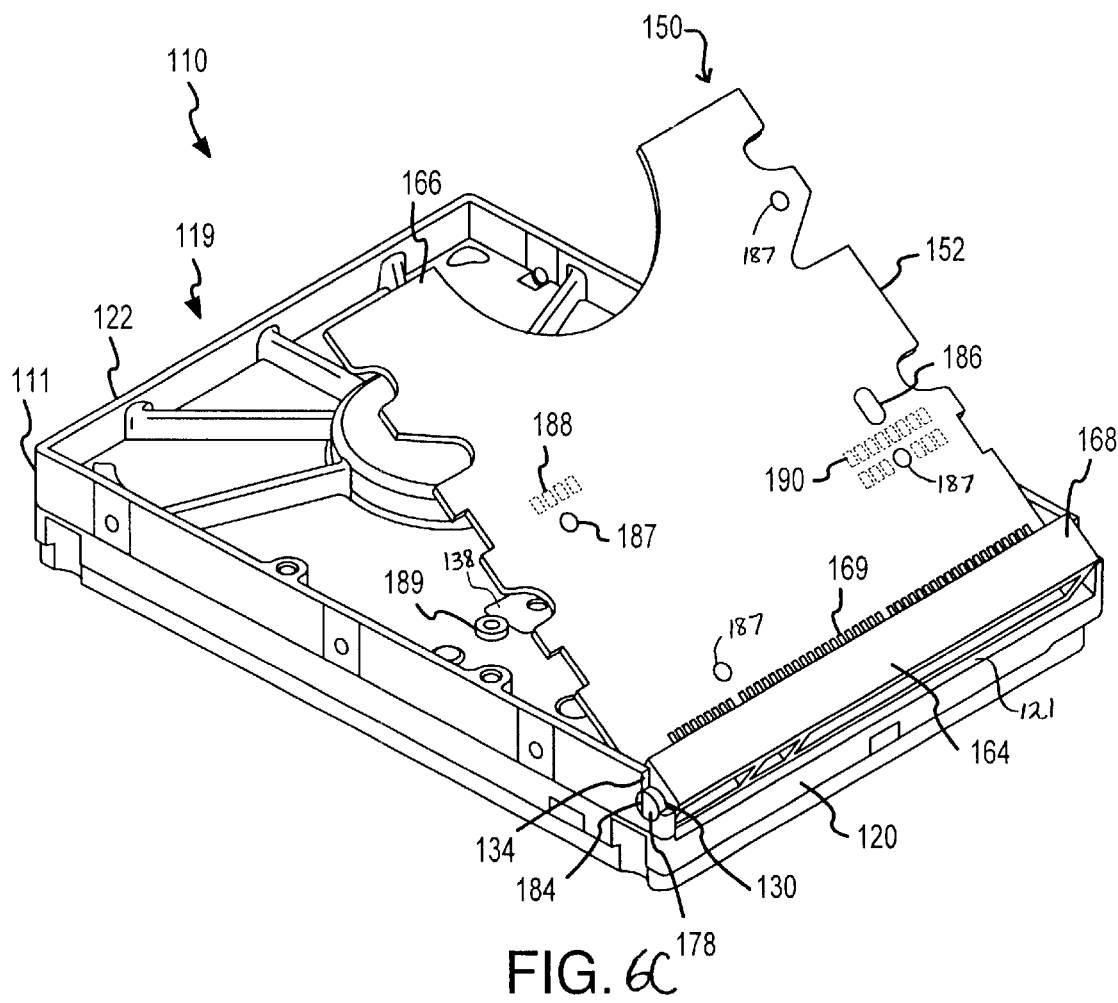
FIG. 6C is a perspective view of the base plate of FIG. 2 before the printed circuit board assembly of FIG. 4A is pivoted into position on the base plate.

The printed circuit board assembly 150 is then advanced in the direction of the arrow 192 until the bosses 176, 178 on the drive interface connector 168 bottom out in their respective mounting slots 128, 130 on the base plate 111. This is illustrated in FIGS. 6A–6C. The presence of the chamfer 121 at/near the first end 120 of the base plate 111 does not inhibit this motion and/or positioning of the printed circuit board assembly 150. In other words, the bosses 176, 178 enter into the respective slots 128, 130 until the peripheral wall 180 of the respective boss 176, 178 contacts a wall 132 that defines each respective mounting slot 128, 130 remote from the opening thereto, without having the first end 164 of the printed circuit board assembly 150 hit the base plate 111. Put another way, the first end 164 of the printed circuit board assembly 150 is moved in a direction substantially aligned with the vertical reference axis 118 toward and perpendicular to the bottom surface 113 of the base plate 111, until further motion of the first end 1164 is inhibited by a wall 132 which defines each of the mounting slots 128, 130. While the base plate interface bosses 176, 178 of the circuit board assembly 150 are being directed into the corresponding mounting slots 128, 130, the angular position of the printed circuit board assembly 150 (with respect to the base plate 111) is substantially maintained at the angle Θ that again corresponds with the angle α noted above.

Based upon the foregoing, when each flat 134 of the mounting slots 128, 130 are parallel with the corresponding planar portions 184 of the base plate interface bosses 176, 178, there is an angle Θ that is formed by the convergence of the bottom surface 113 of the base plate 111 and the second major surface 158 of the printed circuit board 152 that corresponds with the angle α (e.g., within a range of about 15 degrees to about 45 degrees, and in one embodiment is about 23 degrees). Put another way, when the circuit board assembly 150 is pivoted into position such that its major surfaces 156, 158 are parallel to the bottom surface 113 of the base plate 111 (as in FIGS. 7A–7C to be discussed below), the angle α exists between the vertical reference line 194 and the planar portion 184 of the respective base plate interface boss 176, 178, which as noted above is within a range of about 15 degrees to about 45 degrees, and in one embodiment is about 23 degrees. Thus, the planar portion 184 of the peripheral wall 180 of each base plate interface boss 176, 178 is oriented at the angle α relative to the vertical reference axis 118 (in the fully installed position), which is substantially perpendicular to the first and second major surfaces 156, 158 of the printed circuit board 150, such that the planar portion 184 at least generally projects toward the second end 166 of the printed circuit board assembly 150 and at least generally towards the base plate 111. The planar portion 184 can be described as having first and second vertical extremes 185A, 185B, respectively, wherein the first vertical extreme 185A is located between the surface 113 and the second vertical extreme 185B, and where the second vertical extreme 185B is disposed closer to the second end 166 of the printed circuit board 152 than the first vertical extreme 185A. The angle Θ of the planar portion 184 of the base plate interface bosses 176, 178 is important, as this angle Θ corresponds to the angle at which the printed circuit board assembly 150 is generally tilted (with respect to the bottom surface 113 of the base plate 111) when initially positioned on the base plate 111.

Some embodiments have an angle Θ which is less than about 15 degrees or greater than about 45 degrees. In these embodiments the angle Θ would be limited by factors such as, but not limited to, the amount of rotational clearance allowed by the chamfer 121 that is disposed at the same end of the printed circuit board assembly 150 as the bosses 176, 178. In other words, the larger the angle Θ, the greater the amount of clearance required for the chamfer 121 to freely rotate and thus, enable the printed circuit board assembly 150 to be installed on the corresponding base plate assembly 119. Another potential factor to consider is the amount of overlap (providing restriction of vertical movement) between portion(s) 133 of the wall 132 that defines each of the slots 128, 130 and respective part(s) of the arcuate portion 182 of each boss 176, 178.

FIG. 6C illustrates the printed circuit board assembly 150 in a "pre-pivoted" position, wherein the base plate interface bosses 176, 178 of the first end 164 of the printed circuit board assembly 150 have been engaged into the respective mounting slots 128, 130 of the corresponding first end 120 of the base plate 111 to form the base plate assembly 119. Since the second end 166 of the printed circuit board assembly 150 has not yet been pivoted, the planar portion 184 of each of the base plate interface bosses 176, 178 is substantially vertical. In other words, the planar portions 184 of the bosses 176, 178 are parallel to the corresponding flats 134 of mounting slots 128, 130. Since the bosses 176, 178 are configured in a "D" shape or "half-moon" configuration, the mounting slots 128, 130 each have to possess an opening that is sufficiently wide enough to let the "D" or "half-moon" shaped boss 176 or 178 pass through the respective opening when the printed circuit board assembly 150 is tilted to some angular position relative to the bottom surface 113 of the base plate 111, preferably about 23 degrees.

Figure 7A:
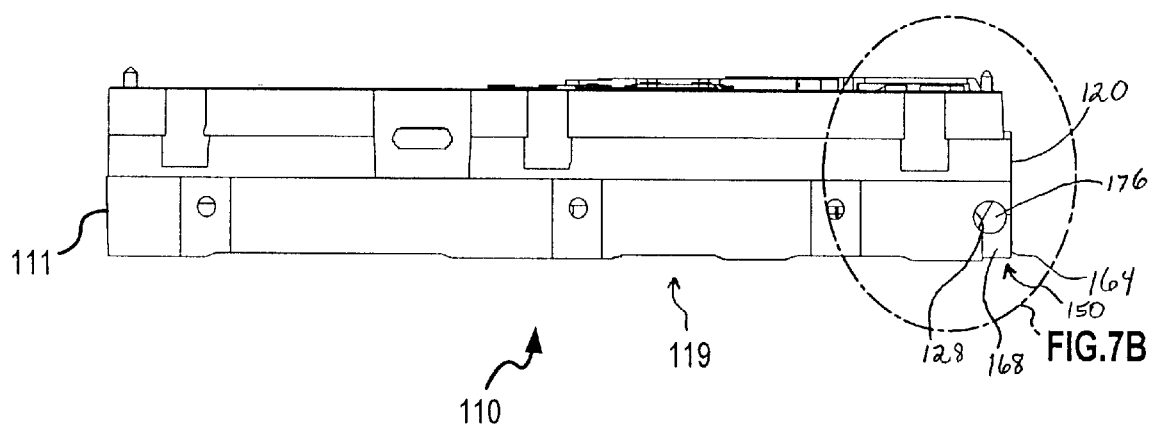
FIG. 7A is a side view of the base plate of FIG. 2, subsequent to the second end of the printed circuit board assembly of FIG. 4A being pivoted toward the bottom surface of the base plate.
Figure 7B:
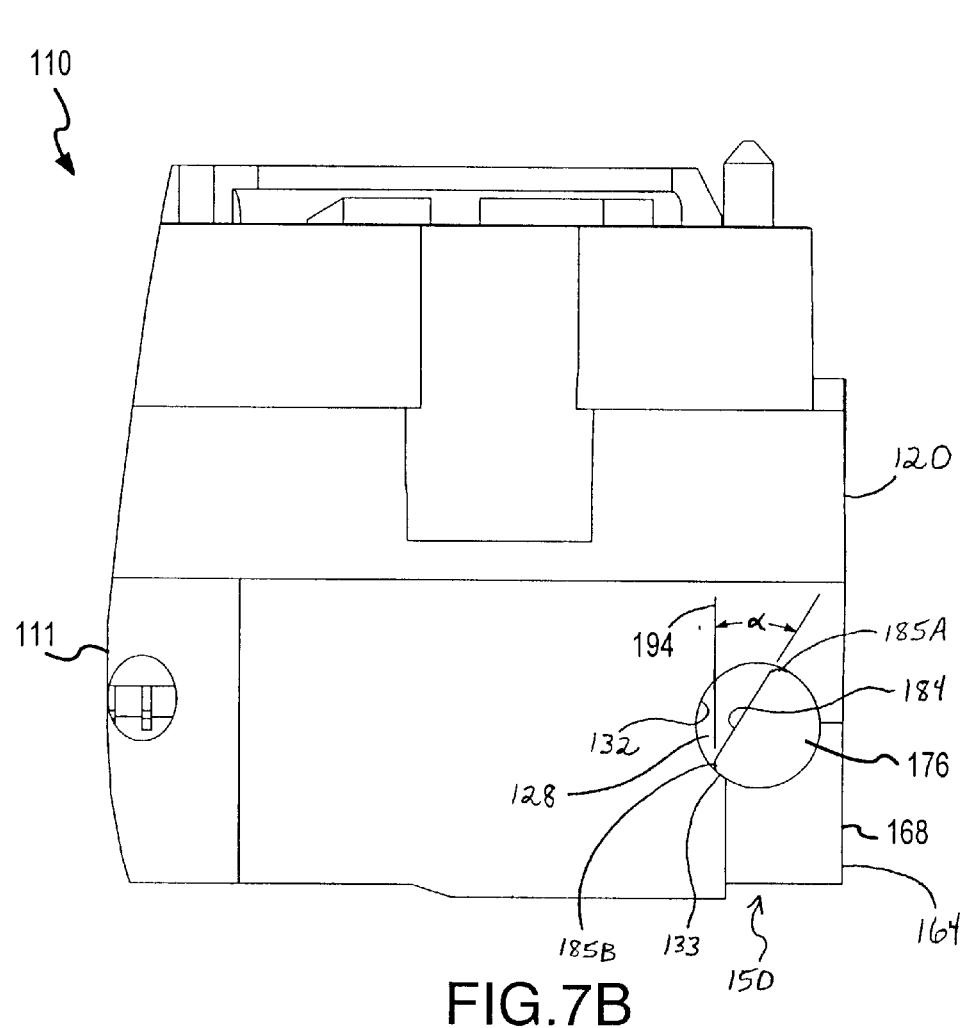
FIG. 7B is a magnified side view of circle 7B of FIG. 7A.
Figure 7C:
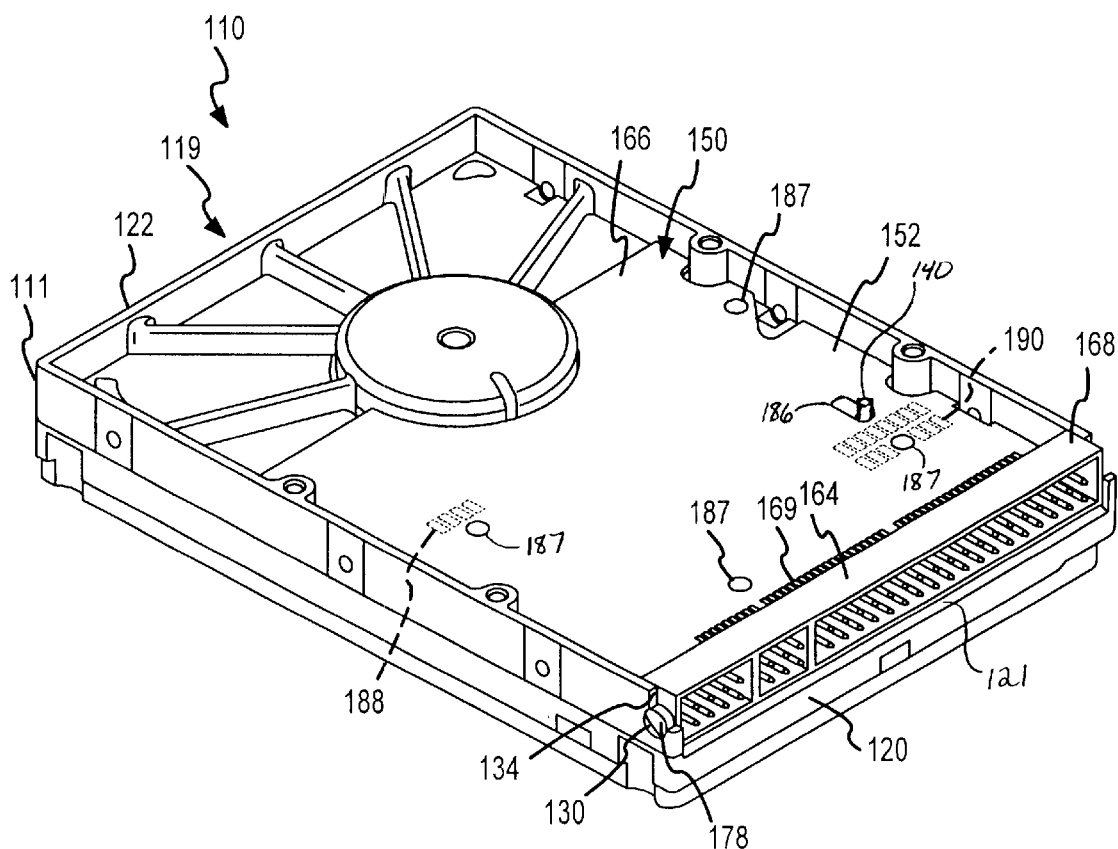
FIG. 7C is a perspective view of the base plate of FIG. 2 after the printed circuit board assembly of FIG. 4A has been pivoted in to position on the base plate.

Once the printed circuit board assembly 150 is in the position of FIGS. 6A–C, the printed circuit board assembly 150 is pivoted in the direction of the arrow 171 in FIG. 6A and into the position illustrated in FIGS. 7A–C. Generally, the printed circuit board assembly 150 pivots about the base plate interface bosses 176, 178, which rotate within their respective slot 128, 132. This pivoting accomplishes a number of functions. As the printed circuit board assembly 150 is pivoted into place, the stabilization pin 140 positioned on the base plate 111 extends through the alignment slot 186 in the printed circuit board 152, providing limitation of side-to-side or lateral movement of the printed circuit board 152 with respect to the base plate 111. Appropriately, the longitudinal extent of the alignment slot 186 is at least generally parallel to a path along which the printed circuit board assembly 150 moves upon the pivoting of the printed circuit board assembly 150 about the first end 164 of the printed circuit board assembly 150, to thereby accommodate the stabilization pin 140 protruding through the alignment slot 186 and moving along the length of the slot 186 during the noted pivoting motion during installation.

The printed circuit board assembly 150 is pivoted so as to dispose the second major surface 158 in interfacing relation with at least part of the bottom surface 113 of the base plate 111. This provides a number of functions. Initially, the base plate interface bosses 176, 178 of the drive interface connector 168 provide a secured relationship in the mounting slots 128, 130 of the base plate 111, thus providing movement restriction of the circuit board assembly 150 with respect to the base plate 111 in both the longitudinal end-to-end and vertical directions. In relation to the vertical motion restriction, the portion 133 of the wall 132 that defines each of the slots 128, 130 engages part of the arcuate portion 182 of each boss 176, 178 in a manner so as to be disposed in vertical alignment with the same (i.e., along an axis that is parallel with the vertical axis 118), with the corresponding portion of the boss 176, 178 being located between this portion 133 and the bottom surface 113 of the base plate 111. Notably, no screws need to pass through the housing 170 of the drive interface connector 168 to provide this function. That is, the "Z" height control of the first end 164 of the printed circuit board assembly 150 is provided by the engagement of the portion 133 of the wall 132 of each slot 128, 132 with its corresponding base plate interface boss 176, 178.

The pivoting of the printed circuit board assembly 150 into the position illustrated in FIGS. 7A–C also establishes the necessary electrical interconnections between printed circuit board assembly 150 and the base plate 111. Namely, the spindle motor connector pads 188 on the printed circuit board 152 are engaged with the spindle motor connector contacts 193 of the spindle motor connector cable (not shown) via the spindle motor connector area 138 of the base plate 111, while the flex connector pads 190 on the printed circuit board 152 are engaged with the flex connector contacts (e.g. 191A) of the flex connector cable (not shown) via the flex connector area 136 of the base plate 111. Finally, the pivoting motion of the printed circuit board assembly 150 into the position of FIGS. 7A–C aligns each of the fastener apertures 187 in the printed circuit board 152 with a corresponding fastener receptacle 189 on the base plate 111. As such, screws (not shown) may be used to further secure the printed circuit board assembly 150 to the base plate 111 by directing a screw through one of the apertures 187 and into the corresponding receptacle 189. Once again, the "lock" provided by the interface between the base plate interface bosses 176, 178 and the walls 132 of their corresponding slots 128, 130 alleviates the need for directing any screws through the housing 170 of the drive interface connector 168 to provide "Z" height control at the first end 164 of the printed circuit board assembly 150.

Therefore, principally the mounting slots 128, 130 are oriented to enable the bosses 176, 178 to rotate within the respective mounting slots 128, 130 to allow for the pivotal installation of the printed circuit board assembly 150 on the base plate 111. However, preferably the mounting slots 128, 130 are designed such that upon pivoting of the printed circuit board assembly 150 into an installed position, the shape of the base plate interface bosses 176, 178 of the printed circuit board assembly 150 must have contact with at least a portion of the respective walls 132 of the mounting slots 128, 130, to prevent disengagement of the bosses 176, 178 from their respective mounting slots 128, 130. Any configuration of the slots 128, 130 and/or the peripheral wall 180 of the base plate interface bosses 176, 178 that provides for the pivoting function, and preferably the locking junction, may be used as well.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A printed circuit board assembly interconnectable with a base plate of a disk drive, wherein said printed circuit board assembly comprises:

a printed circuit board comprising a first reference axis defining a longitudinal extent of said printed circuit board, first and second major surfaces, first and second sides that are at least generally longitudinally extending and laterally spaced relative to said first reference axis, a first end, and a second end longitudinally spaced from said first end relative to said first reference axis;

a drive interface connector disposed at said first end of said printed circuit board; and first and second base plate interface bosses extending at least generally away relative to said first and second sides of said printed circuit board, respectively, wherein each of said first and second base plate interface bosses comprises a peripheral wall, and wherein each said peripheral wall comprises an arcuate portion.

2. A printed circuit board assembly, as claimed in claim 1, wherein said base plate interface bosses are attached to said drive interface connector.

3. A printed circuit board assembly, as claimed in claim 2, wherein said drive interface connector comprises a housing comprising first and second ends, wherein said first and second base plate interface bosses are disposed on said first and second ends, respectively, of said drive interface connector.

4. A printed circuit board assembly, as claimed in claim 2, wherein said drive interface connector comprises a housing, and wherein said first and second base plate interface bosses are integrally formed with said housing.

5. A printed circuit board assembly, as claimed in claim 4, wherein said housing of said drive interface connector and said first and second base plate interface bosses are plastic.

6. A printed circuit board assembly, as claimed in claim 1, wherein said first and second base plate interface bosses each comprise means for restraining movement of said first end of said printed circuit board assembly from said base plate when said printed circuit board assembly is installed on said base plate.

7. A printed circuit board assembly, as claimed in claim 1, wherein said first and second base plate interface bosses comprise means for pivotally installing said printed circuit board assembly on said base plate.

8. A printed circuit board assembly, as claimed in claim 1, further comprising a plurality of screw holes to affix said printed circuit board assembly to said base plate, and wherein none of said plurality of screw holes extends through said drive interface connector.

9. A printed circuit board assembly, as claimed in claim 1, wherein each said peripheral wall further comprises a planar portion.

10. A printed circuit board assembly, as claimed in claim 9, wherein said planar portion of said peripheral wall is disposed at an angle between about 15 degrees and about 45 degrees relative to a vertical reference axis which is substantially perpendicular to each of said first and second major surfaces of said printed circuit board, and wherein said planar portion at least generally projects toward said second end of said printed circuit board assembly.

11. A printed circuit board assembly, as claimed in claim 9, wherein said planar portion of said peripheral wall is disposed at an angle of about 23 degrees relative to a vertical reference axis which is substantially perpendicular to the first and second major surfaces of said printed circuit board, wherein said planar portion at least generally projects toward said second end of said printed circuit board assembly, wherein said second major surface of said printed circuit board projects toward said base plate when said printed circuit board assembly is installed, wherein said planar portion comprises first and second vertical extremes, wherein said second vertical extreme is located between said base plate and said first vertical extreme when said printed circuit board assembly is installed, and wherein said first vertical extreme is disposed closer to said second end of said printed circuit board than said second vertical extreme.

12. A printed circuit board assembly, as claimed in claim 9, wherein said second major surface of said printed circuit board projects toward said base plate when said printed circuit board assembly is installed, wherein said planar portion of each of said first and second base plate interface bosses at least generally project toward both said second major surface of said printed circuit board and toward said second end of said printed circuit board.

13. A printed circuit board assembly, as claimed in claim 1, wherein each of said first and second base plate interface bosses are disposed at least generally perpendicular to said first reference axis.

14. A printed circuit board assembly, as claimed in claim 1, wherein said printed circuit board comprises a first alignment slot that extends through said printed circuit board, and wherein a longitudinal extent of said first alignment slot is at least generally parallel to said first reference axis.

15. A printed circuit board assembly, as claimed in claim 14, wherein said printed circuit board comprises a second alignment slot that extends through said printed circuit board, and wherein a longitudinal extent of said second alignment slot is parallel to said first reference axis.

16. A base plate assembly for a disk drive, wherein a first reference axis defines a longitudinal extent of said base plate assembly, wherein said base plate assembly comprises:

a base plate comprising first and second base plate sides that are at least generally longitudinally extending and laterally spaced relative to said first reference axis, first and second base ends that are at least generally laterally extending and longitudinally spaced relative to said first reference axis, a top base surface, a bottom base surface, and first and second printed circuit board assembly mounting slots that are at least generally concave, wherein at least a portion of each of said first and second printed circuit board assembly mounting slots is arcuately shaped; and a printed circuit board assembly, wherein said printed circuit board assembly comprises:

a printed circuit board comprising first and second major board surfaces, first and second board sides that are at least generally longitudinally extending and laterally spaced relative to said first reference axis, a first board end, and a second board end longitudinally spaced from said first board end relative to said first reference axis, wherein said second major board surface interfaces with said bottom base surface of said base plate;

a drive interface connector disposed at said first board end of said printed circuit board; and first and second base plate interface bosses extending at least generally away relative to said first and second board sides of said printed circuit board, respectively, and disposed in said first and second printed circuit board assembly mounting slots, respectively of said base plate.

17. A base plate assembly, as claimed in claim 16, wherein said first and second printed circuit board assembly mounting slots are disposed at least generally proximate said first base end of said base plate.

18. A base plate assembly, as claimed in claim 16, wherein an axis of about which each of said first and second printed circuit board assembly mounting slots extend is at least generally perpendicular to said first reference axis.

19. A base plate assembly, as claimed in claim 16, wherein said base plate further comprises a flat disposed above each of said first and second printed circuit board assembly mounting slots.

20. A base plate assembly, as claimed in claim 19, wherein each said flat is contained within a reference plane that is at least generally perpendicular to said first and second major board surfaces of said printed circuit board.

21. A base plate assembly, as claimed in claim 16, wherein each of said first and second printed circuit board assembly mounting slots is at least generally concave such that said first and second base plate interface bosses of said printed circuit board assembly may be directed within said first and second printed circuit board assembly mounting slots, respectively.

22. A base plate assembly, as claimed in claim 16, wherein each of said first and second printed circuit board assembly mounting slots comprises an arcuate extent of at least about 190 degrees relative to a central axis about which said first and second printed circuit board assembly mounting slots are disposed.

23. A base plate assembly, as claimed in claim 16, wherein each of said first and second printed circuit board assembly mounting slots is defined by a slot wall, wherein a portion of said slot wall of said first printed circuit board assembly mounting slot vertically captures said first base plate interface boss therein, and wherein a portion of said slot wall of said second printed circuit board assembly mounting slot vertically captures said second base plate interface boss therein.

24. A base plate assembly, as claimed in claim 16, wherein said first base end of said base plate comprises a chamfer that extends at least from said first printed circuit board mounting slot to said second printed circuit board mounting slot.

25. A base plate assembly, as claimed in claim 16, wherein said base plate interface bosses are attached to said drive interface connector of said printed circuit board assembly.

26. A base plate assembly, as claimed in claim 25, wherein said drive interface connector comprises a housing comprising first and second ends, wherein said first and second base plate interface bosses are disposed on said first and second ends, respectively, of said drive interface connector.

27. A base plate assembly, as claimed in claim 25, wherein said drive interface connector comprises a housing, and wherein said first and second base plate interface bosses are integrally formed with said housing.

28. A base plate assembly, as claimed in claim 16, wherein said first and second base plate interface bosses and said first and second printed circuit board assembly mounting slots, in combination, comprise means for preventing movement of said first board end of said printed circuit board assembly at least generally away from said base plate when said printed circuit board assembly is installed on said base plate.

29. A base plate assembly, as claimed in claim 16, wherein said first and second base plate interface bosses and said first and second printed circuit board assembly mounting slots, in combination, comprise a means for pivotally installing said printed circuit board assembly on said base plate.

30. A base plate assembly, as claimed in claim 16, further comprising a plurality of screw holes to affix said printed circuit board assembly to said base plate, and wherein none of said plurality of screw holes extends through said drive interface connector.

31. A base plate assembly, as claimed in claim 16, wherein each of said first and second base plate interface bosses comprises an annular peripheral wall, wherein each said peripheral wall comprises an arcuate portion and a planar portion.

32. A base plate assembly, as claimed in claim 31, wherein said planar portion of said peripheral wall is disposed at an angle between about 15 degrees and about 45 degrees relative to said third reference axis and at least generally projects toward said second board end of said printed circuit board assembly.

33. A base plate assembly, as claimed in claim 31, wherein said planar portion of said peripheral wall is disposed at an angle of about 23 degrees relative to a vertical reference axis which is substantially perpendicular to the first and second major surfaces of said printed circuit board, wherein said planar portion at least generally projects toward said second end of said printed circuit board assembly, wherein said second major surface of said printed circuit board projects toward said base plate when said printed circuit board assembly is installed, wherein said planar portion comprises first and second vertical extremes, wherein said second vertical extreme is located between said base plate and said first vertical extreme when said printed circuit board assembly is installed, and wherein said first vertical extreme is disposed closer to said second end of said printed circuit board than said second vertical extreme.

34. A base plate assembly, as claimed in claim 31, wherein said second major surface of said printed circuit board projects toward said base plate when said printed circuit board assembly is installed, and wherein said planar portion of each of said first and second base plate interface bosses at least generally project toward both said second major surface of said printed circuit board and said second board end.

35. A base plate assembly, as claimed in claim 16, wherein each of said first and second base plate interface bosses are disposed at least generally perpendicular to said first reference axis.

36. A base plate assembly, as claimed in claim 16, wherein said printed circuit board comprises a first alignment slot that extends through said printed circuit board, wherein a longitudinal extent of said first alignment slot is at least generally parallel to said first reference axis, and wherein said base plate further comprises a first alignment pin disposed within said first alignment slot.

37. A base plate assembly, as claimed in claim 36, wherein said printed circuit board comprises a second alignment slot that extends through said printed circuit board, wherein a longitudinal extent of said second alignment slot is parallel to said first reference axis, and wherein said base plate further comprises a second alignment pin disposed within said second alignment slot.

38. A method of installing a printed circuit board on a base plate, said method comprising the steps of:
disposing a first end of a printed circuit board assembly against said base plate and at an angle relative to said base plate; and
pivoting a second end of said printed circuit board assembly toward said base plate and at least generally about said first end.

39. A method, as claimed in claim 38, wherein said angle is within a range of about 15 degrees to about 45 degrees and is defined between a printed circuit board of said printed circuit board assembly and a reference plane that at least generally contains said base plate.

40. A method, as claimed in claim 38, wherein said angle is about 67 degrees and is defined between a printed circuit board of said printed circuit board assembly and a reference plane that at least generally contains said base plate.

41. A method, as claimed in claim 38, further comprising the step of moving said first end of said printed circuit board assembly toward said base plate along a path that is perpendicular to a surface of said base plate that interfaces with a surface of a printed circuit board of said printed circuit board assembly, wherein said moving step is executed after said disposing step and before said pivoting step.

42. A method, as claimed in claim 38, wherein said pivoting step comprises simultaneously locking said first end of said printed circuit board to said base plate at least in a dimension that is perpendicular to a surface of said base plate that interfaces with a printed circuit board of said printed circuit board assembly.

43. A method, as claimed in claim 38, further comprising the step of locking said first end of said printed circuit board assembly to said base plate using only said pivoting step.

44. A method, as claimed in claim 38, wherein said printed circuit board assembly comprises a pair of base plate interface bosses, wherein each said base plate interface boss comprises a flat, and wherein said base plate comprises a pair of slots, wherein said base plate further comprises a flat disposed beyond each said slot, and wherein said disposing step comprises engaging said flats of said base plate interface bosses with a corresponding said flat on said base plate.

45. A method, as claimed in claim 44, further comprising the step of directing said base plate interface bosses into corresponding said slots while at least substantially maintaining said printed circuit board assembly at said angle, wherein said directing step is executed before said pivoting step.

46. A method, as claimed in claim 38, wherein said printed circuit board assembly comprises a drive interface connector on a first end of said printed circuit board assembly and a pair of said base plate interface bosses that extend away from first and second sides of said printed circuit board assembly, wherein said base plate comprises a pair of slots, and wherein said disposing step comprises positioning said base plate interface bosses of said printed circuit board assembly in said slots of said base plate.

47. A method, as claimed in claim 46, further comprising the step of fixing said printed circuit board assembly to said base plate using a plurality of screws, wherein said printed circuit board assembly comprises a drive interface connector, wherein none of said plurality of screws pass through said drive interface connector.

48. A method, as claimed in claim 38, wherein said pivoting step comprises directing an alignment pin on said base plate within an alignment slot extending through said printed circuit board assembly.

49. A method, as claimed in claim 48, wherein a longitudinal extent of said alignment slot is at least generally parallel to a path along which said printed circuit board assembly moves during said pivoting step.

50. A method, as claimed in claim 38, wherein said pivoting step comprises directing each of a plurality of alignment pins on said base plate within a corresponding alignment slot extending through said printed circuit board assembly.

51. A method, as claimed in claim 38, further comprising the step of disposing a plurality of spindle motor connection pads on said printed circuit board assembly and disposing a plurality of spindle motor connection contacts on said base plate, so as to have a longitudinal extent that is at least generally parallel to a direction of said pivoting step.

52. A method, as claimed in claim 38, further comprising the step of disposing a plurality of flex cable connector pads on said printed circuit board assembly and disposing a plurality of flex cable connector contacts on said base plate so as to have a longitudinal extent that is at least generally parallel to a direction of said pivoting step.

53. A printed circuit board assembly interconnectable with a base plate of a disk drive, wherein said printed circuit board assembly comprises:
   a printed circuit board comprising a first reference axis defining a longitudinal extent of said printed circuit board, first and second major surfaces, first and second sides that are at least generally longitudinally extending and laterally spaced relative to said first reference axis, a first end, and a second end longitudinally spaced from said first end relative to said first reference axis;
   a drive interface connector disposed at said first end of said printed circuit board; and
   first and second base plate interface bosses extending at least generally away relative to said first and second sides of said printed circuit board, respectively, wherein each of said first and second base plate interface bosses comprises an annular, peripheral wall, and wherein each said peripheral wall comprises an arcuate portion and a planar portion.

54. A printed circuit board assembly, as claimed in claim 53, wherein said planar portion of said peripheral wall is disposed at an angle between about 15 degrees and about 45 degrees relative to a vertical reference axis which is substantially perpendicular to each of said first and second major surfaces of said printed circuit board, and wherein said planar portion at least generally projects toward said second end of said printed circuit board assembly.

55. A printed circuit board assembly, as claimed in claim 53, wherein said planar portion of said peripheral wall is disposed at an angle of about 23 degrees relative to a vertical reference axis which is substantially perpendicular to the first and second major surfaces of said printed circuit board, wherein said planar portion at least generally projects toward said second end of said printed circuit board assembly, wherein said second major surface of said printed circuit board projects toward said base plate when said printed circuit board assembly is installed, wherein said planar portion comprises first and second vertical extremes, wherein said second vertical extreme is located between said base plate and said first vertical extreme when said printed circuit board assembly is installed, and wherein said first vertical extreme is disposed closer to said second end of said printed circuit board than said second vertical extreme.

56. A printed circuit board assembly, as claimed in claim 53, wherein said second major surface of said printed circuit board projects toward said base plate when said printed circuit board assembly is installed, wherein said planar portion of each of said first and second base plate interface bosses at least generally project toward both said second major surface of said printed circuit board and toward said second end of said printed circuit board.

57. A base plate assembly for a disk drive, wherein a first reference axis defines a longitudinal extent of said base plate assembly, wherein said base plate assembly comprises:
   a base plate comprising first and second base plate sides that are at least generally longitudinally extending and laterally spaced relative to said first reference axis, first and second base ends that are at least generally laterally extending and longitudinally spaced relative to said first reference axis, a top base surface, a bottom base surface, and first and second printed circuit board assembly mounting slots that are at least generally concave, wherein said base plate further comprises a flat disposed above each of said first and second printed circuit board assembly mounting slots; and
   a printed circuit board assembly, wherein said printed circuit board assembly comprises:
      a printed circuit board comprising first and second major board surfaces, first and second board sides that are at least generally longitudinally extending and laterally spaced relative to said first reference axis, a first board end, and a second board end longitudinally spaced from said first board end relative to said first reference axis, wherein said second major board surface interfaces with said bottom base surface of said base plate;
      a drive interface connector disposed at said first board end of said printed circuit board; and
      first and second base plate interface bosses extending at least generally away relative to said first and second board sides of said printed circuit board, respectively, and disposed in said first and second printed circuit board assembly mounting slots, respectively of said base plate.

58. A base plate assembly, as claimed in claim 57, wherein each said flat is contained within a reference plane that is at least generally perpendicular to said first and second major board surfaces of said printed circuit board.

59. A base plate assembly for a disk drive, wherein a first reference axis defines a longitudinal extent of said base plate assembly, wherein said base plate assembly comprises:
   a base plate comprising first and second base plate sides that are at least generally longitudinally extending and laterally spaced relative to said first reference axis, first and second base ends that are at least generally laterally extending and longitudinally spaced relative to said first reference axis, a top base surface, a bottom base surface, and first and second printed circuit board assembly mounting slots that are at least generally concave, wherein each of said first and second printed circuit board assembly mounting slots comprises an arcuate extent of at least about 190 degrees relative to a central axis about which said first and second printed circuit board assembly mounting slots are disposed; and
   a printed circuit board assembly, wherein said printed circuit board assembly comprises:
      a printed circuit board comprising first and second major board surfaces, first and second board sides that are at least generally longitudinally extending and laterally spaced relative to said first reference axis, a first board end, and a second board end longitudinally spaced from said first board end relative to said first reference axis, wherein said second major board surface interfaces with said bottom base surface of said base plate;
      a drive interface connector disposed at said first board end of said printed circuit board; and
      first and second base plate interface bosses extending at least generally away relative to said first and second board sides of said printed circuit board, respectively, and disposed in said first and second printed circuit board assembly mounting slots, respectively of said base plate.

60. A base plate assembly for a disk drive, wherein a first reference axis defines a longitudinal extent of said base plate assembly, wherein said base plate assembly comprises:

a base plate comprising first and second base plate sides that are at least generally longitudinally extending and laterally spaced relative to said first reference axis, first and second base ends that are at least generally laterally extending and longitudinally spaced relative to said first reference axis, a top base surface, a bottom base surface, and first and second printed circuit board assembly mounting slots that are at least generally concave; and a printed circuit board assembly, wherein said printed circuit board assembly comprises:

a printed circuit board comprising first and second major board surfaces, first and second board sides that are at least generally longitudinally extending and laterally spaced relative to said first reference axis, a first board end, and a second board end longitudinally spaced from said first board end relative to said first reference axis, wherein said second major board surface interfaces with said bottom base surface of said base plate;

a drive interface connector disposed at said first board end of said printed circuit board; and first and second base plate interface bosses extending at least generally away relative to said first and second board sides of said printed circuit board, respectively, and disposed in said first and second printed circuit board assembly mounting slots, respectively of said base plate, wherein each of said first and second base plate interface bosses comprises an annular peripheral wall, wherein each said peripheral wall comprises an arcuate portion and a planar portion.

61. A base plate assembly, as claimed in claim 60, wherein said planar portion of said peripheral wall is disposed at an angle between about 15 degrees and about 45 degrees relative to said third reference axis and at least generally projects toward said second board end of said printed circuit board assembly.

62. A base plate assembly, as claimed in claim 60, wherein said planar portion of said peripheral wall is disposed at an angle of about 23 degrees relative to a vertical reference axis which is substantially perpendicular to the first and second major surfaces of said printed circuit board, wherein said planar portion at least generally projects toward said second end of said printed circuit board assembly, wherein said second major surface of said printed circuit board projects toward said base plate when said printed circuit board assembly is installed, wherein said planar portion comprises first and second vertical extremes, wherein said second vertical extreme is located between said base plate and said first vertical extreme when said printed circuit board assembly is installed, and wherein said first vertical extreme is disposed closer to said second end of said printed circuit board than said second vertical extreme.

63. A base plate assembly, as claimed in claim 60, wherein said second major surface of said printed circuit board projects toward said base plate when said printed circuit board assembly is installed, and wherein said planar portion of each of said first and second base plate interface bosses at least generally project toward both said second major surface of said printed circuit board and said second board end.

64. A base plate assembly for a disk drive, wherein a first reference axis defines a longitudinal extent of said base plate assembly, wherein said base plate assembly comprises:

a base plate comprising first and second base plate sides that are at least generally longitudinally extending and laterally spaced relative to said first reference axis, first and second base ends that are at least generally laterally extending and longitudinally spaced relative to said first reference axis, a top base surface, a bottom base surface, and first and second printed circuit board assembly mounting slots that are at least generally concave; and a printed circuit board assembly, wherein said printed circuit board assembly comprises:

a printed circuit board comprising first and second major board surfaces, first and second board sides that are at least generally longitudinally extending and laterally spaced relative to said first reference axis, a first board end, and a second board end longitudinally spaced from said first board end relative to said first reference, axis, wherein said second major board surface interfaces with said bottom base surface of said base plate;

a drive interface connector disposed at said first board end of said printed circuit board; and first and second base plate interface bosses extending at least generally away relative to said first and second board sides of said printed circuit board, respectively, and disposed in said first and second printed circuit board assembly mounting slots, respectively of said base plate, wherein said first and second base plate interface bosses and said first and second printed circuit board assembly mounting slots, in combination, comprise a means for pivotally installing said printed circuit board assembly on said base plate.

* * * * *